United States Patent
Aitken et al.

(10) Patent No.: US 12,517,282 B2
(45) Date of Patent: Jan. 6, 2026

(54) CONTACT LENSES CONTAINING LIGHT ABSORBING REGIONS AND METHODS FOR THEIR PREPARATION

(71) Applicant: Johnson & Johnson Vision Care, Inc., Jacksonville, FL (US)

(72) Inventors: Brian Aitken, Jacksonville, FL (US); Shivkumar Mahadevan, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 676 days.

(21) Appl. No.: 18/052,010

(22) Filed: Nov. 2, 2022

(65) Prior Publication Data

US 2023/0296807 A1  Sep. 21, 2023

Related U.S. Application Data

(60) Provisional application No. 63/265,705, filed on Dec. 20, 2021.

(51) Int. Cl.
| | |
|---|---|
| C08L 83/04 | (2006.01) |
| C09B 11/28 | (2006.01) |
| C09B 15/00 | (2006.01) |
| C09B 62/465 | (2006.01) |
| C09K 9/02 | (2006.01) |
| G02B 1/04 | (2006.01) |
| G02C 7/04 | (2006.01) |
| G02C 7/10 | (2006.01) |

(52) U.S. Cl.
CPC ............. *G02B 1/043* (2013.01); *C08L 83/04* (2013.01); *C09B 11/28* (2013.01); *C09B 15/00* (2013.01); *C09B 62/465* (2013.01); *C09K 9/02* (2013.01); *G02C 7/04* (2013.01); *G02C 7/104* (2013.01); *C09K 2211/1018* (2013.01)

(58) Field of Classification Search
None
See application file for complete search history.

(56) References Cited

U.S. PATENT DOCUMENTS

| | | | |
|---|---|---|---|
| 3,034,403 A | 5/1962 | Neefe | |
| 3,408,429 A | 10/1968 | Otto | |
| 3,660,545 A | 5/1972 | Wichterle | |
| 3,808,178 A | 4/1974 | Gaylord | |

(Continued)

FOREIGN PATENT DOCUMENTS

| | | |
|---|---|---|
| CN | 100551679 C | 10/2009 |
| CN | 103605215 B | 1/2015 |

(Continued)

OTHER PUBLICATIONS

"Compendium of Polymer Terminology and Nomenclature: IUPAC Recommendations", edited by: Richard G. Jones, Jaroslav Kahovec, Robert Stepto, Edward S. Wilks, Michael Hess, Tatsuki Kitayama, and W. Val Metanomski, 2008.

(Continued)

*Primary Examiner* — Peter A Salamon
(74) *Attorney, Agent, or Firm* — Raef M. Shaltout

(57) ABSTRACT

Described are contact lenses containing light absorbing chromophores, wherein the light absorbing chromophore is concentrated in one or more select regions of the lens. Also described are methods for making such contact lenses.

22 Claims, 5 Drawing Sheets

UV-VIS Spectra of Precursor 1 Lenses and Example 1A-C Lenses

(56) References Cited

U.S. PATENT DOCUMENTS

| | | | |
|---|---|---|---|
| 4,113,224 A | 9/1978 | Clark et al. |
| 4,120,570 A | 10/1978 | Gaylord |
| 4,136,250 A | 1/1979 | Mueller et al. |
| 4,153,641 A | 5/1979 | Deichert et al. |
| 4,197,266 A | 4/1980 | Clark et al. |
| 4,252,421 A | 2/1981 | Foley, Jr. |
| 4,436,887 A | 3/1984 | Chromecek et al. |
| 4,447,474 A | 5/1984 | Neefe |
| 4,495,313 A | 1/1985 | Larsen |
| 4,640,805 A | 2/1987 | Neefe |
| 4,659,782 A | 4/1987 | Spinelli |
| 4,659,783 A | 4/1987 | Spinelli |
| 4,681,412 A | 7/1987 | Lemelson |
| 4,740,533 A | 4/1988 | Su et al. |
| 4,889,664 A | 12/1989 | Kindt-larsen et al. |
| 4,910,277 A | 3/1990 | Bambury et al. |
| 4,981,487 A | 1/1991 | da Costa |
| 5,006,622 A | 4/1991 | Kunzler et al. |
| 5,034,461 A | 7/1991 | Lai et al. |
| 5,039,459 A | 8/1991 | Kindt-Larsen et al. |
| 5,070,215 A | 12/1991 | Bambury et al. |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |
| 5,314,960 A | 5/1994 | Spinelli et al. |
| 5,331,067 A | 7/1994 | Seidner et al. |
| 5,371,147 A | 12/1994 | Spinelli et al. |
| 5,617,154 A | 4/1997 | Hoffman |
| 5,760,100 A | 6/1998 | Nicolson et al. |
| 5,776,999 A | 7/1998 | Nicolson et al. |
| 5,789,461 A | 8/1998 | Nicolson et al. |
| 5,824,719 A | 10/1998 | Kunzler et al. |
| 5,849,811 A | 12/1998 | Nicolson et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,020,445 A | 2/2000 | Vanderlaan et al. |
| 6,087,415 A | 7/2000 | Vanderlaan et al. |
| 6,305,801 B1 | 10/2001 | Kerns, Jr. et al. |
| 6,367,929 B1 | 4/2002 | Maiden et al. |
| 6,420,453 B1 | 7/2002 | Bowers et al. |
| 6,423,761 B1 | 7/2002 | Bowers et al. |
| 6,467,904 B1 | 10/2002 | Gartley et al. |
| 6,767,979 B1 | 7/2004 | Muir et al. |
| 6,811,257 B1 | 11/2004 | Lehat |
| 6,822,016 B2 | 11/2004 | Mccabe et al. |
| 6,867,245 B2 | 3/2005 | Iwata et al. |
| 6,943,203 B2 | 9/2005 | Vanderlaan et al. |
| 6,951,894 B1 | 10/2005 | Nicolson et al. |
| 7,052,131 B2 | 5/2006 | Mccabe et al. |
| 7,247,692 B2 | 7/2007 | Laredo |
| 7,249,848 B2 | 7/2007 | Laredo et al. |
| 7,364,291 B2 | 4/2008 | Haywood et al. |
| 7,396,890 B2 | 7/2008 | Zanini et al. |
| 7,461,937 B2 | 12/2008 | Steffen et al. |
| 7,468,398 B2 | 12/2008 | Nicolson et al. |
| 7,538,146 B2 | 5/2009 | Nicolson et al. |
| 7,553,880 B2 | 6/2009 | Nicolson et al. |
| 7,556,750 B2 | 7/2009 | Xiao et al. |
| 7,572,841 B2 | 8/2009 | Chen et al. |
| 7,666,921 B2 | 2/2010 | Mccabe et al. |
| 7,691,916 B2 | 4/2010 | Mccabe et al. |
| 7,786,185 B2 | 8/2010 | Rathore et al. |
| 7,825,170 B2 | 11/2010 | Steffen et al. |
| 7,915,323 B2 | 3/2011 | Awasthi et al. |
| 7,934,830 B2 | 5/2011 | Blackwell et al. |
| 7,956,131 B2 | 6/2011 | Arnold et al. |
| 7,994,356 B2 | 8/2011 | Awasthi et al. |
| 8,022,158 B2 | 9/2011 | Rathore et al. |
| 8,138,290 B2 | 3/2012 | Blackwell et al. |
| 8,163,206 B2 | 4/2012 | Chang et al. |
| 8,273,802 B2 | 9/2012 | Laredo et al. |
| 8,389,597 B2 | 3/2013 | Blackwell et al. |
| 8,399,538 B2 | 3/2013 | Steffen et al. |
| 8,415,404 B2 | 4/2013 | Nicolson et al. |
| 8,420,711 B2 | 4/2013 | Awasthi et al. |
| 8,450,387 B2 | 5/2013 | Mccabe et al. |
| 8,470,906 B2 | 6/2013 | Rathore et al. |
| 8,487,058 B2 | 7/2013 | Liu et al. |
| 8,507,577 B2 | 8/2013 | Zanini et al. |
| 8,568,626 B2 | 10/2013 | Nicolson et al. |
| 8,637,621 B2 | 1/2014 | Iwata et al. |
| 8,697,770 B2 | 4/2014 | Duis et al. |
| 8,703,891 B2 | 4/2014 | Broad |
| 8,937,110 B2 | 1/2015 | Alli et al. |
| 8,937,111 B2 | 1/2015 | Alli et al. |
| 8,940,812 B2 | 1/2015 | Reboul et al. |
| 8,960,898 B1 | 2/2015 | Etzkorn |
| 8,980,972 B2 | 3/2015 | Driver |
| 9,056,878 B2 | 6/2015 | Fujisawa et al. |
| 9,057,821 B2 | 6/2015 | Broad et al. |
| 9,125,808 B2 | 9/2015 | Alli et al. |
| 9,125,829 B2 | 9/2015 | Bonda et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,217,813 B2 | 12/2015 | Liu et al. |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 10,359,643 B2 | 7/2019 | Wildsmith et al. |
| 10,935,695 B2* | 3/2021 | Mahadevan ............ G02B 1/04 |
| 2003/0103188 A1 | 6/2003 | Zeltzer |
| 2003/0142267 A1 | 7/2003 | Gemert et al. |
| 2006/0226401 A1 | 10/2006 | Xiao et al. |
| 2008/0033546 A1 | 2/2008 | Liang |
| 2009/0072206 A1 | 3/2009 | Kim et al. |
| 2010/0048847 A1 | 2/2010 | Broad |
| 2011/0248415 A1* | 10/2011 | Alvarez-Carrigan ...................... B29D 11/00634 264/1.36 |
| 2013/0083287 A1* | 4/2013 | Li ............ G02B 1/043 351/159.02 |
| 2013/0258276 A1 | 10/2013 | Hansen et al. |
| 2017/0285370 A1 | 10/2017 | Leip |
| 2018/0037690 A1 | 2/2018 | Aitken et al. |
| 2018/0095296 A1 | 4/2018 | Lin et al. |
| 2019/0271798 A1* | 9/2019 | Mahadevan .......... A61L 31/145 |
| 2020/0094501 A1 | 3/2020 | Min |
| 2020/0355940 A1 | 11/2020 | Duis et al. |
| 2020/0407324 A1 | 12/2020 | Mahadevan et al. |
| 2020/0407337 A1 | 12/2020 | Mahadevan |
| 2021/0018765 A1* | 1/2021 | Duis ................. G02C 7/04 |
| 2021/0190992 A1* | 6/2021 | Martin .................. G02C 7/102 |
| 2021/0371731 A1* | 12/2021 | Jing ................ B29D 11/00134 |
| 2022/0057655 A1 | 2/2022 | Chiu et al. |

FOREIGN PATENT DOCUMENTS

| | | |
|---|---|---|
| CN | 107463001 A | 12/2017 |
| CN | 107884953 A | 4/2018 |
| CN | 109975995 | 7/2019 |
| CN | 110879480 A | 3/2020 |
| EP | 0080539 B1 | 6/1983 |
| EP | 122771 A1 | 10/1984 |
| GB | 2305256 A | 4/1997 |
| KR | 2017058079 A | 5/2017 |
| KR | 2008138 B1 | 8/2019 |
| KR | 2154810 B1 | 9/2020 |
| TW | 556859 U | 3/2018 |
| TW | 638203 B | 10/2018 |
| TW | 202102349 A | 1/2021 |
| WO | 2003022321 A2 | 3/2003 |
| WO | 2008061992 A2 | 5/2008 |
| WO | 2015038611 A1 | 3/2015 |
| WO | 2016100457 A1 | 6/2016 |
| WO | 2019027346 A1 | 2/2019 |

(56) References Cited

FOREIGN PATENT DOCUMENTS

| WO | 2019033415 A1 | 2/2019 |
| WO | 2021006411 A1 | 1/2021 |

OTHER PUBLICATIONS

Crivello, et al., "Photoinitiators for Free Radical Cationic &amp; Anionic Photopolymerisation", In 2nd Edition, vol. III, pp. 275-298, 1998.
ISO 18369-4, "Ophthalmic Optics—Contact Lenses—Part 4: Physicochemical Properties of Contact Lens Materials", In International Organization for Standardization, 38 Pages, Aug. 15, 2006.
O'Brien et al, Imaging system to assess objectively the optical density of the macular pigment in vivo, Applied Optics, Sep. 1, 2013, pp. 6201-6212, vol. 52, No. 25, Optical Society of America.
U.S. Appl. No. 17/456,659.
Horiguchi et al, Reversible coloring/decoloring reaction of leuco dye controlled by long-chain molecule, Elsevier, Feb. 22, 2008, pp. 2591-2594, vol. 516, No. 9.
PCT International Search Report, dated Feb. 14, 2023, for PCT Int'l Appln. No. PCT/IB2022/061558.

\* cited by examiner

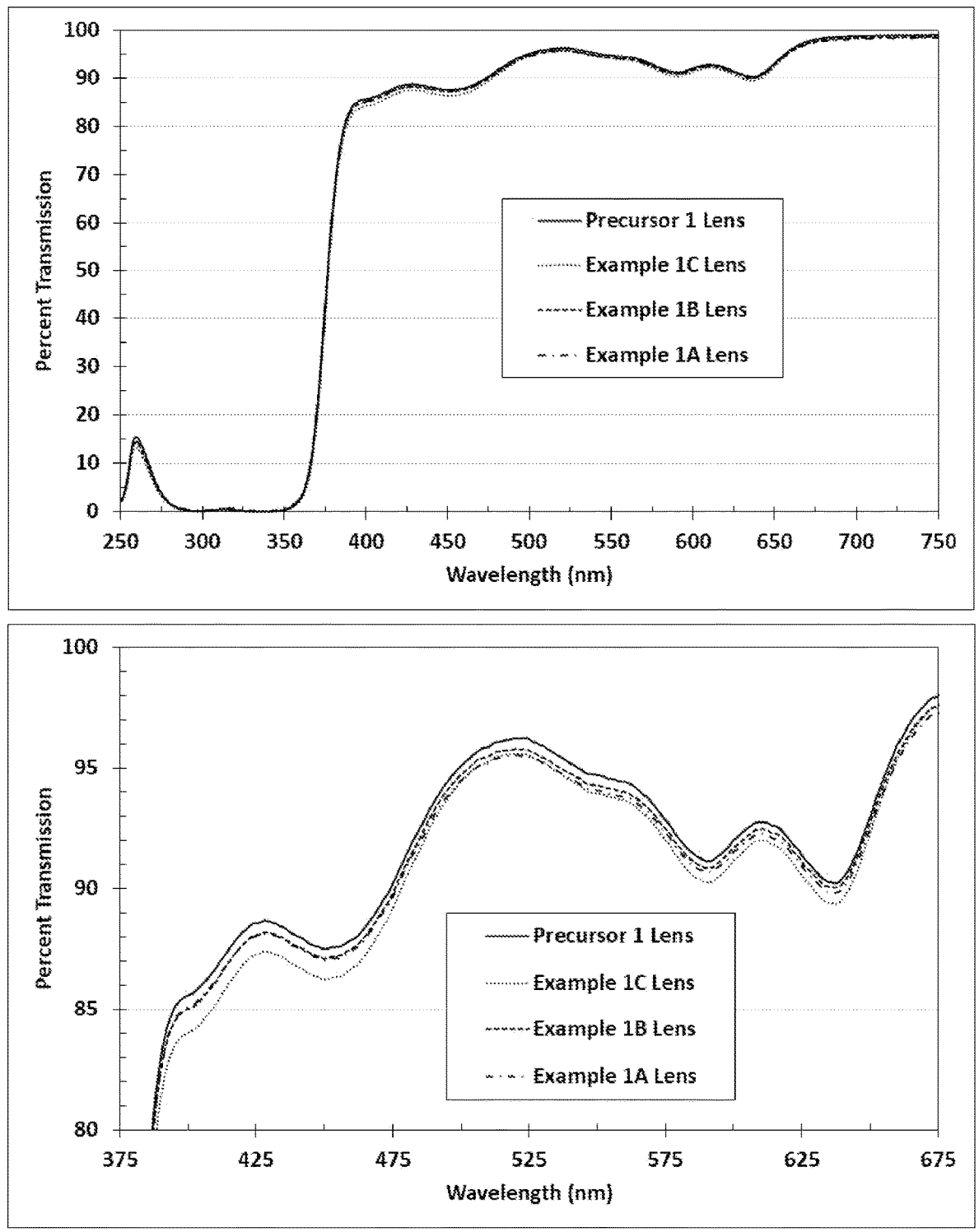
FIG. 1 - UV-VIS Spectra of Precursor 1 Lenses and Example 1A-C Lenses

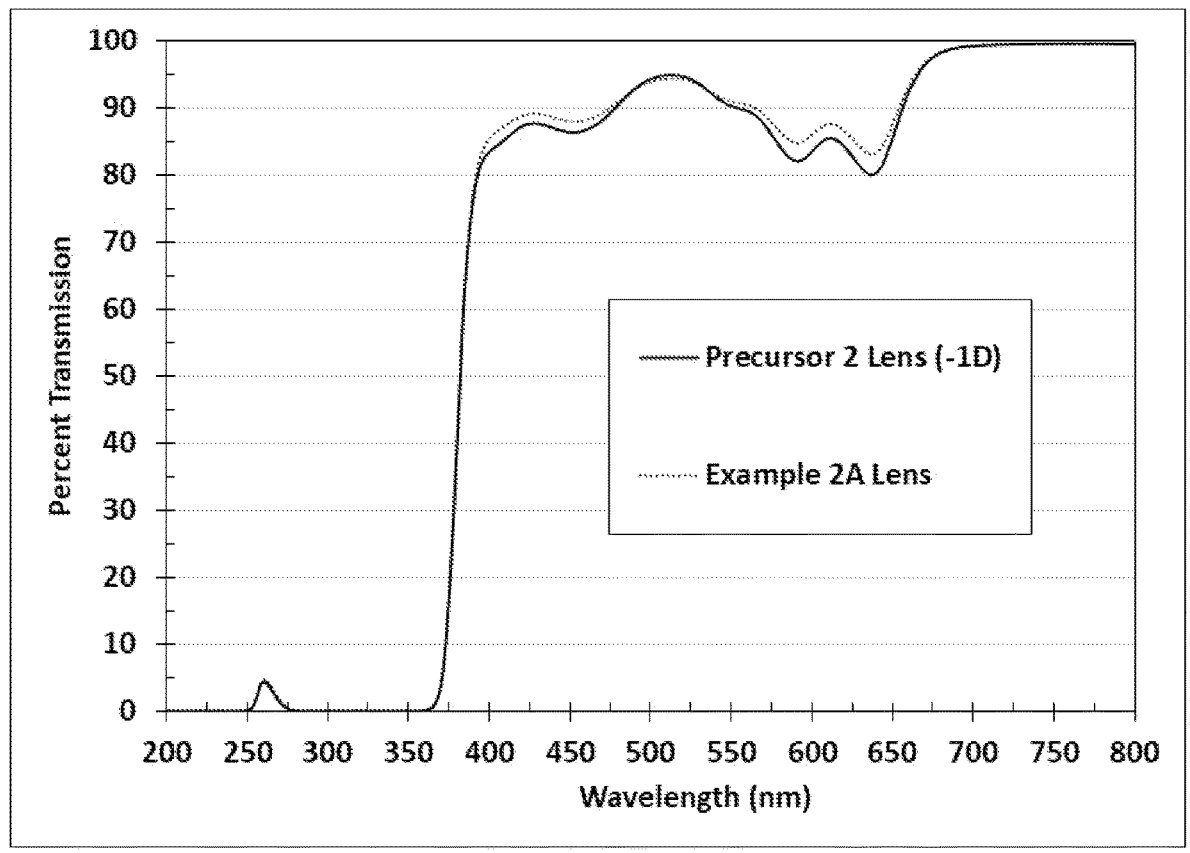
FIG. 2 – UV-VIS Transmission Spectra of Precursor 2 Lens (-1D) and Example 2A Lens

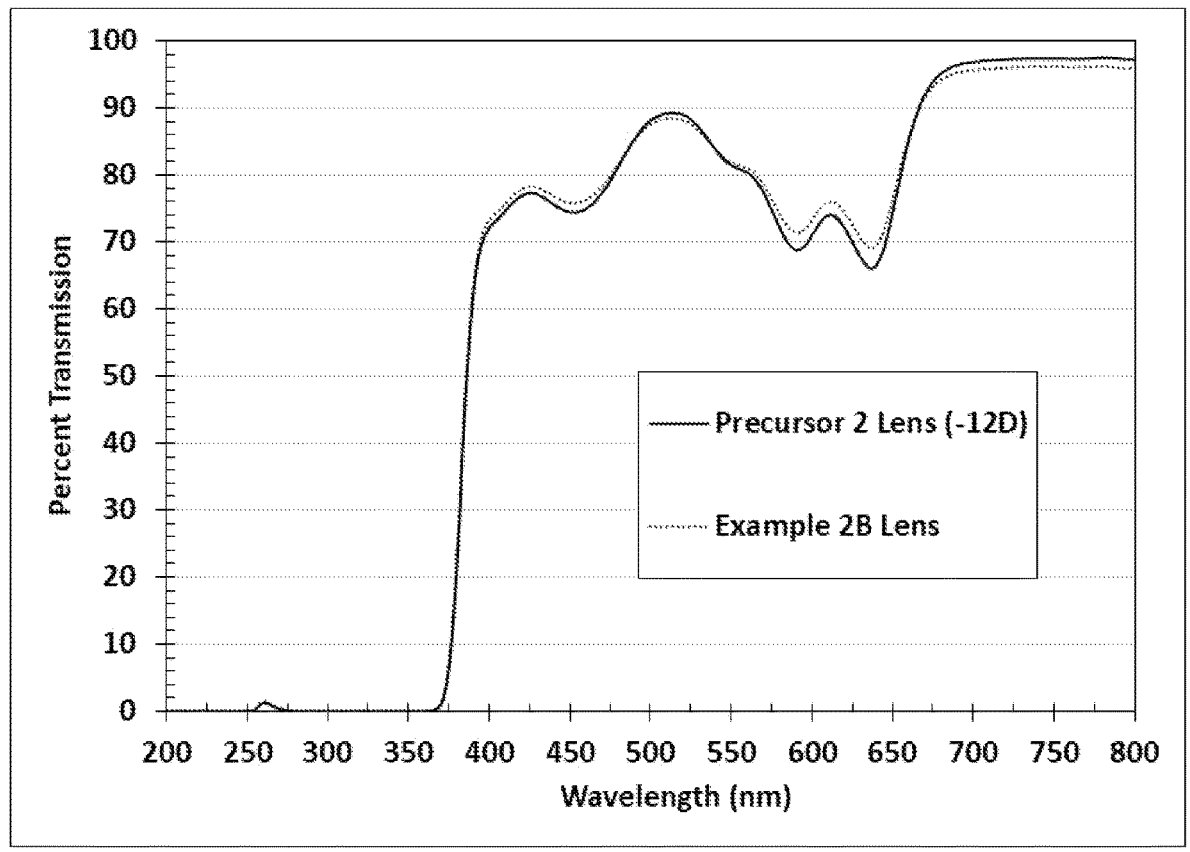
FIG. 3 – UV-VIS Transmission Spectra of Precursor 2 Lens (-12D) and Example 2B Lens

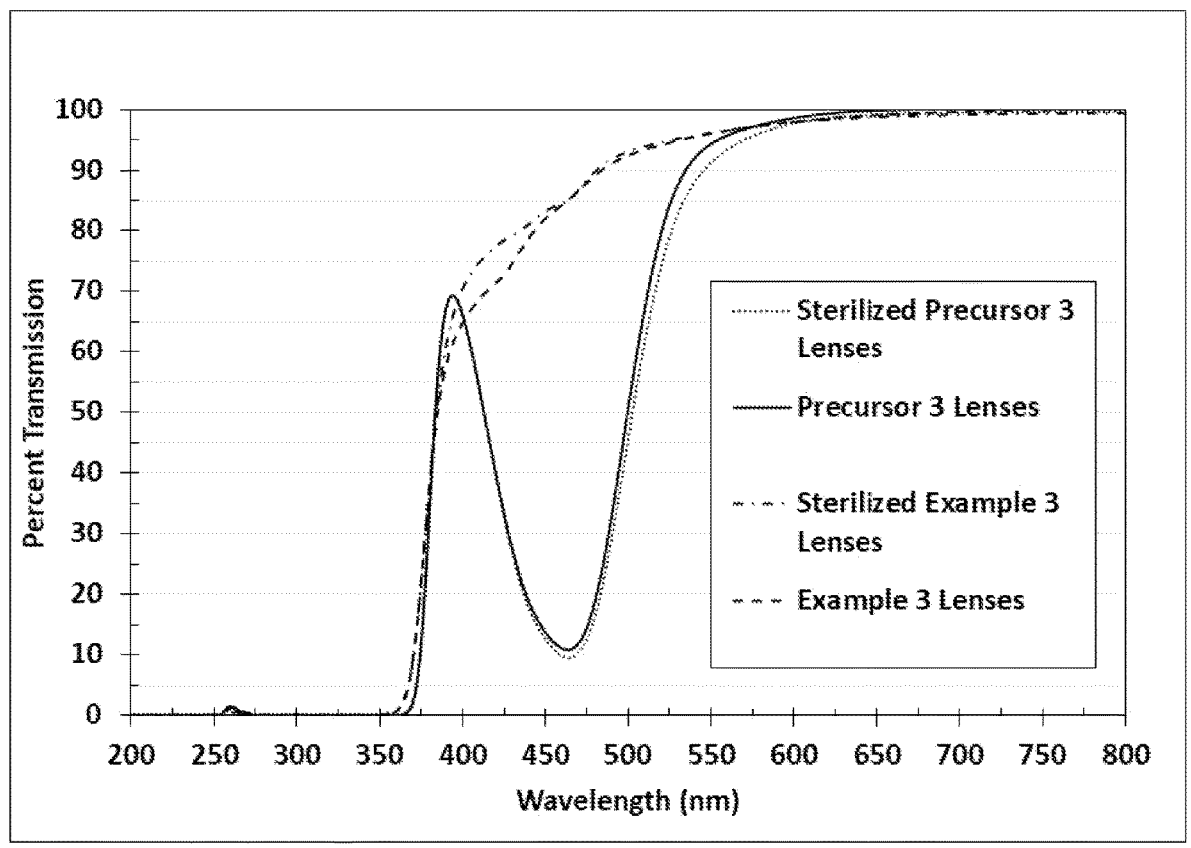
FIG. 4 – UV-VIS Transmission Spectra of Sterile and Nonsterile Precursor 3 Lenses and Example 3 Lenses

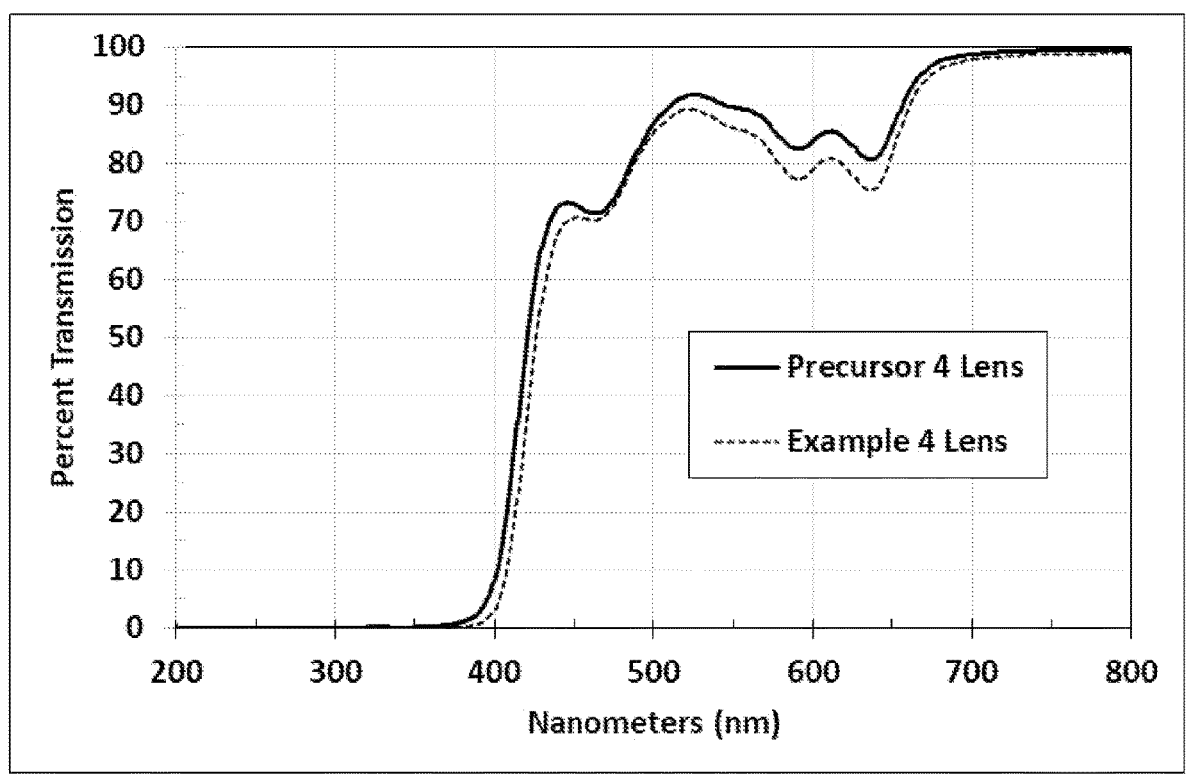
FIG. 5 – UV-VIS Transmission Spectra of Precursor 4 Lens (-1D) and Example 4 Lens

CONTACT LENSES CONTAINING LIGHT ABSORBING REGIONS AND METHODS FOR THEIR PREPARATION

RELATED APPLICATIONS

This application claims priority to U.S. Provisional Patent Application Ser. No. 63/265,705, filed Dec. 20, 2021, which is incorporated herein by reference in its entirety.

FIELD OF THE INVENTION

The invention relates to contact lenses that contain light absorbing chromophores. More particularly, the invention relates to a contact lens in which a light absorbing chromophore is concentrated in one or more select regions of the lens. The invention also relates to methods for making such lenses.

BACKGROUND OF THE INVENTION

Contact lenses have been used commercially to improve vision since the 1950s. Currently available contact lenses remain a cost-effective means for vision correction. The thin lenses fit over the cornea of the eye to correct vision defects, including myopia or nearsightedness, hyperopia or farsightedness, astigmatism, i.e., asphericity in the cornea, and presbyopia, i.e., the loss of the ability of the crystalline lens to accommodate.

In recent years, contact lenses have been developed that incorporate spectral filters to absorb specific wavelengths of visible and/or UV radiation, thus allowing the lenses to be tailored for different uses, including the protection of the cornea, lens and retina from harmful or undesirable radiation wavelengths. For example, contact lenses that incorporate visible light absorbing chromophores, including high-energy visible light (HEVL) absorbers, green light absorbers, and the like, have been described. In addition, both static and photochromic chromophores have been incorporated in contact lenses.

Generally, spectral filtering contact lenses are edge-to-edge, meaning that the absorbing chromophore is distributed throughout the lens. While distribution of the chromophore throughout the lens facilitates the manufacture of the lens, there are drawbacks. For instance, because visible light absorbing chromophores may themselves exhibit a highly noticeable color, the incorporation of such materials on an edge-to-edge basis may be undesirable for cosmetic reasons.

One potential approach for reducing the cosmetic issue is to localize the light absorbing chromophore in the central region of the lens, such that it primarily covers the pupil of the eye. While processes for making pupil-only light absorbing contact lenses have been described, such processes are typically complex, may add significant cost to the manufacturing process, and may distort or otherwise undesirably impact the optical and/or mechanical properties of the lens.

It would be an advance in the art, therefore, to develop new light absorbing contact lenses having a light absorbing chromophore localized in certain regions of the lens, as well as commercially viable processes for making such contact lenses.

SUMMARY OF THE INVENTION

The invention concerns contact lenses that have light absorbing properties, such as being capable of absorbing various wavelengths of visible light including, for instance, high energy visible light. The light absorbing material, or chromophore, in the lens is concentrated in one or more select regions of the lens, instead of being substantially evenly distributed throughout the lens. Such selective concentration provides a number of advantages over edge to edge chromophore incorporation including, for example, improved aesthetics.

The inventors have discovered that a contact lens as described herein, containing a visible light chromophore in a select region of the lens, for instance in the central zone, may be prepared by a facile manufacturing method. The manufacturing method is straightforward to adopt and minimizes undesirable side effects, such as distortion of the lens or negatively impacting the lens' mechanical properties.

Accordingly, in one aspect, the invention provides a contact lens. The contact lens comprises: a first region; a second region; a visible light absorbing chromophore; and a derivative of the visible light absorbing chromophore, wherein the first region contains the visible light absorbing chromophore and the second region contains the derivative of the visible light absorbing chromophore, and wherein the second region has a greater average percent transmission than the first region across a wavelength range of 400 nm to 600 nm.

The invention also provides a method for making a contact lens. The method comprises: providing a lens precursor having a first region and a second region and containing a visible light absorbing chromophore in the first region and the second region; and selectively derivatizing the visible light absorbing chromophore within the second region to form a derivative of the visible light absorbing chromophore, the derivative having a greater average percent transmission than the visible light absorbing chromophore across a wavelength range of 400 nm to 600 nm.

BRIEF DESCRIPTION OF DRAWINGS

FIG. 1 shows UV-VIS transmission spectra of exemplary contact lenses prepared according to Example 1A-C and compared to lens precursors that have not undergone derivatization.

FIG. 2 shows UV-VIS transmission spectra of Precursor 2 lenses (underivatized) as described in the Examples, as well as inventive Example 2A and 2B lenses (dyed center zone after derivatizing the periphery) for minus one diopter lenses.

FIG. 3 shows UV-VIS transmission spectra of Precursor 2 lenses (underivatized) as described in the Examples, as well as inventive Example 2A and 2B lenses (dyed center zone after derivatizing the periphery) for the minus twelve diopter lenses.

FIG. 4 shows UV-VIS transmission spectra of Precursor 3 lenses and Example 3 lenses after sterilization.

FIG. 5 shows UV-VIS transmission spectra of Precursor 4 lenses and Example 4 lenses.

DETAILED DESCRIPTION OF THE INVENTION

It is to be understood that the invention is not limited to the details of construction or process steps set forth in the following description. The invention is capable of other embodiments and of being practiced or being carried out in various ways using the teaching herein.

With respect to the terms used in this disclosure, the following definitions are provided.

Unless defined otherwise, all technical and scientific terms used herein have the same meaning as commonly understood by one of ordinary skill in the art to which the invention belongs. The polymer definitions are consistent with those disclosed in the Compendium of Polymer Terminology and Nomenclature, IUPAC Recommendations 2008, edited by: Richard G. Jones, Jaroslav Kahovec, Robert Stepto, Edward S. Wilks, Michael Hess, Tatsuki Kitayama, and W. Val Metanomski. All publications, patent applications, patents, and other references mentioned herein are incorporated by reference.

As used herein, the term "(meth)" designates optional methyl substitution. Thus, a term such as "(meth)acrylates" denotes both methacrylates and acrylates.

Wherever chemical structures are given, it should be appreciated that alternatives disclosed for the substituents on the structure may be combined in any combination. Thus, if a structure contained substituents R* and R**, each of which contained three lists of potential groups, 9 combinations are disclosed. The same applies for combinations of properties.

When a subscript, such as "n" in the generic formula [***]n, is used to depict the number of repeating units in a polymer's chemical formula, the formula should be interpreted to represent the number average molecular weight of the macromolecule.

The term "individual" includes humans and vertebrates.

The term "biomedical device" refers to any article that is designed to be used while either in or on mammalian tissues or fluids, and preferably in or on human tissue or fluids. Examples of these devices include but are not limited to wound dressings, sealants, tissue fillers, drug delivery systems, coatings, adhesion prevention barriers, catheters, implants, stents, and ophthalmic devices such as intraocular lenses and contact lenses. The biomedical devices may be ophthalmic devices, particularly contact lenses, most particularly contact lenses made from silicone hydrogels or conventional hydrogels.

The term "ocular surface" includes the surface and glandular epithelia of the cornea, conjunctiva, lacrimal gland, accessory lacrimal glands, nasolacrimal duct and meibomian gland, and their apical and basal matrices, puncta and adjacent or related structures, including eyelids linked as a functional system by both continuity of epithelia, by innervation, and the endocrine and immune systems.

The term "ophthalmic device" refers to any optical device relating to the eye and includes devices which resides in or on the eye or any part of the eye, including the ocular surface. These devices can provide optical correction, cosmetic enhancement, vision enhancement, therapeutic benefit (for example as bandages) or delivery of active components such as pharmaceutical and nutraceutical components, or a combination of any of the foregoing. Examples of ophthalmic devices include but are not limited to lenses, optical and ocular inserts, including but not limited to punctal plugs, and the like. "Lenses" include spectacle lenses, sunglass lenses, soft contact lenses, hard contact lenses, hybrid contact lenses, intraocular lenses, and overlay lenses. The ophthalmic device may comprise a contact lens.

The term "contact lens" refers to an ophthalmic device that can be placed on the cornea of an individual's eye. The contact lens may provide corrective, cosmetic, or therapeutic benefit, including wound healing, the delivery of drugs or nutraceuticals, diagnostic evaluation or monitoring, ultraviolet light absorbing, visible light or glare reduction, or any combination thereof. A contact lens can be of any appropriate material known in the art and can be a soft lens, a hard lens, or a hybrid lens containing at least two distinct portions with different physical, mechanical, or optical properties, such as modulus, water content, light transmission, or combinations thereof.

The biomedical devices, ophthalmic devices, and lenses of the present invention may be comprised of silicone hydrogels or conventional hydrogels. Silicone hydrogels typically contain at least one hydrophilic monomer and at least one silicone-containing component that are covalently bound to one another in the cured device.

"Target macromolecule" means the macromolecule being synthesized from the reactive monomer mixture comprising monomers, macromers, prepolymers, cross-linkers, initiators, additives, diluents, and the like.

The term "polymerizable compound" means a compound containing one or more polymerizable groups. The term encompasses, for instance, monomers, macromers, oligomers, prepolymers, cross-linkers, and the like.

"Polymerizable groups" are groups that can undergo chain growth polymerization, such as free radical and/or cationic polymerization, preferably free radical polymerization, for example a carbon-carbon double bond which can polymerize when subjected to radical polymerization initiation conditions. Non-limiting examples of polymerizable groups include (meth)acrylates, styryls, (meth)acrylamides, and vinyl groups. Preferably, the polymerizable group is selected from (meth)acrylate, (meth)acrylamide, N-vinyl lactam, N-vinylamide, vinyl carbonate, vinyl ether, vinyl carbamate, and styryl functional groups. More preferably, the polymerizable group is selected from (meth)acrylates and (meth)acrylamides. The polymerizable group may be unsubstituted or substituted. For instance, the nitrogen atom in (meth)acrylamide may be bonded to a hydrogen, or the hydrogen may be replaced with alkyl or cycloalkyl (which themselves may be further substituted).

Any type of free radical polymerization may be used including but not limited to bulk, solution, suspension, and emulsion as well as any of the controlled radical polymerization methods such as stable free radical polymerization, nitroxide-mediated living polymerization, atom transfer radical polymerization, reversible addition fragmentation chain transfer polymerization, organotellurium mediated living radical polymerization, and the like.

A "monomer" is a mono-functional molecule which can undergo chain growth polymerization, and in particular, free radical polymerization, thereby creating a repeating unit in the chemical structure of the target macromolecule. Some monomers have di-functional impurities that can act as cross-linking agents. A "hydrophilic monomer" is also a monomer which yields a clear single phase solution when mixed with deionized water at 25° C. at a concentration of 5 weight percent. A "hydrophilic component" is a monomer, macromer, prepolymer, initiator, cross-linker, additive, or polymer which yields a clear single phase solution when mixed with deionized water at 25° C. at a concentration of 5 weight percent. A "hydrophobic component" is a monomer, macromer, prepolymer, initiator, cross-linker, additive, or polymer which is slightly soluble or insoluble in deionized water at 25° C.

A "macromolecule" is an organic compound having a number average molecular weight of greater than 1500, and may be reactive or non-reactive.

A "macromonomer" or "macromer" is a macromolecule that has one group that can undergo chain growth polymerization, and in particular, free radical polymerization, thereby creating a repeating unit in the chemical structure of the target macromolecule. Typically, the chemical structure of the macromer is different than the chemical structure of the target macromolecule, that is, the repeating unit of the macromer's pendent group is different than the repeating unit of the target macromolecule or its mainchain. The difference between a monomer and a macromer is merely one of chemical structure, molecular weight, and molecular weight distribution of the pendent group. As a result, and as used herein, the patent literature occasionally defines monomers as polymerizable compounds having relatively low molecular weights of about 1,500 Daltons or less, which inherently includes some macromers. In particular, monomethacryloxypropyl terminated mono-n-butyl terminated polydimethylsiloxane (molecular weight=500-1500 g/mol) (mPDMS) and mono-(2-hydroxy-3-methacryloxypropyl)-propyl ether terminated mono-n-butyl terminated polydimethylsiloxane (molecular weight=500-1500 g/mol) (OH-mPDMS) may be referred to as monomers or macromers. Furthermore, the patent literature occasionally defines macromers as having one or more polymerizable groups, essentially broadening the common definition of macromer to include prepolymers. As a result and as used herein, di-functional and multi-functional macromers, prepolymers, and crosslinkers may be used interchangeably.

A "silicone-containing component" is a monomer, macromer, prepolymer, cross-linker, initiator, additive, or polymer in the reactive mixture with at least one silicon-oxygen bond, typically in the form of siloxy groups, siloxane groups, carbosiloxane groups, and mixtures thereof.

Examples of silicone-containing components which are useful in this invention may be found in U.S. Pat. Nos. 3,808,178, 4,120,570, 4,136,250, 4,153,641, 4,740,533, 5,034,461, 5,070,215, 5,244,981, 5,314,960, 5,331,067, 5,371,147, 5,760,100, 5,849,811, 5,962,548, 5,965,631, 5,998,498, 6,367,929, 6,822,016, 6,943,203, 6,951,894, 7,052,131, 7,247,692, 7,396,890, 7,461,937, 7,468,398, 7,538,146, 7,553,880, 7,572,841, 7,666,921, 7,691,916, 7,786,185, 7,825,170, 7,915,323, 7,994,356, 8,022,158, 8,163,206, 8,273,802, 8,399,538, 8,415,404, 8,420,711, 8,450,387, 8,487,058, 8,568,626, 8,937,110, 8,937,111, 8,940,812, 8,980,972, 9,056,878, 9,125,808, 9,140,825, 9,156,934, 9,170,349, 9,217,813, 9,244,196, 9,244,197, 9,260,544, 9,297,928, 9,297,929, and European Patent No. 080539. These patents are hereby incorporated by reference in their entireties.

A "polymer" is a target macromolecule composed of the repeating units of the monomers used during polymerization.

A "homopolymer" is a polymer made from one monomer; a "copolymer" is a polymer made from two or more monomers; a "terpolymer" is a polymer made from three monomers. A "block copolymer" is composed of compositionally different blocks or segments. Diblock copolymers have two blocks. Triblock copolymers have three blocks. "Comb or graft copolymers" are made from at least one macromer.

A "repeating unit" is the smallest group of atoms in a polymer that corresponds to the polymerization of a specific monomer or macromer.

An "initiator" is a molecule that can decompose into radicals which can subsequently react with a monomer to initiate a free radical polymerization reaction. A thermal initiator decomposes at a certain rate depending on the temperature; typical examples are azo compounds such as 1,1'-azobisisobutyronitrile and 4,4'-azobis(4-cyanovaleric acid), peroxides such as benzoyl peroxide, tert-butyl peroxide, tert-butyl hydroperoxide, tert-butyl peroxybenzoate, dicumyl peroxide, and lauroyl peroxide, peracids such as peracetic acid and potassium persulfate as well as various redox systems. A photo-initiator decomposes by a photochemical process; typical examples are derivatives of benzil, benzoin, acetophenone, benzophenone, camphorquinone, and mixtures thereof as well as various monoacyl and bisacyl phosphine oxides and combinations thereof.

A "cross-linking agent" is a di-functional or multi-functional monomer or macromer which can undergo free radical polymerization at two or more locations on the molecule, thereby creating branch points and a polymeric network. Common examples are ethylene glycol dimethacrylate, tetraethylene glycol dimethacrylate, trimethylolpropane trimethacrylate, methylene bisacrylamide, triallyl cyanurate, and the like.

A "prepolymer" is a reaction product of monomers which contains remaining polymerizable groups capable of undergoing further reaction to form a polymer.

A "polymeric network" is a cross-linked macromolecule that may swell but cannot dissolve in solvents. "Hydrogels" are polymeric networks that swell in water or aqueous solutions, typically absorbing at least 10 weight percent water. "Silicone hydrogels" are hydrogels that are made from at least one silicone-containing component with at least one hydrophilic component. Hydrophilic components may also include non-reactive polymers.

"Conventional hydrogels" refer to polymeric networks made from components without any siloxy, siloxane or carbosiloxane groups. Conventional hydrogels are prepared from reactive mixtures comprising hydrophilic monomers. Examples include 2-hydroxyethyl methacrylate ("HEMA"), N-vinyl pyrrolidone ("NVP"), N, N-dimethylacrylamide ("DMA") or vinyl acetate. U.S. Pat. Nos. 4,436,887, 4,495,313, 4,889,664, 5,006,622, 5,039459, 5,236,969, 5,270,418, 5,298,533, 5,824,719, 6,420,453, 6,423,761, 6,767,979, 7,934,830, 8,138,290, and 8,389,597 disclose the formation of conventional hydrogels. Commercially available conventional hydrogels include, but are not limited to, etafilcon, genfilcon, hilafilcon, lenefilcon, nesofilcon, omafilcon, polymacon, and vifilcon, including all of their variants.

"Silicone hydrogels" refer to polymeric networks made from at least one hydrophilic component and at least one silicone-containing component. Examples of suitable families of hydrophilic components that may be present in the reactive mixture include (meth)acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof. Silicone-containing components are well known and have been extensively described in the patent literature. For instance, the silicone-containing component may comprise at least one polymerizable group (e.g., a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing), at least one siloxane group, and one or more linking groups (which may be a bond) connecting the polymerizable group(s) to the siloxane group(s). The silicone-containing components may, for instance, contain from 1 to 220 siloxane repeat units. The silicone-containing component may also contain at least one fluorine atom. Silicone hydrogel lenses may contain a coating, and the coating may be the same or different material from the substrate.

Examples of silicone hydrogels include acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, including all of their variants, as well as silicone hydrogels as prepared in U.S. Pat. Nos. 4,659,782, 4,659,783, 5,244, 981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847. These patents are hereby incorporated by reference in their entireties.

An "interpenetrating polymeric network" comprises two or more networks which are at least partially interlaced on the molecular scale but not covalently bonded to each other and which cannot be separated without braking chemical bonds. A "semi-interpenetrating polymeric network" comprises one or more networks and one or more polymers characterized by some mixing on the molecular level between at least one network and at least one polymer. A mixture of different polymers is a "polymer blend." A semi-interpenetrating network is technically a polymer blend, but in some cases, the polymers are so entangled that they cannot be readily removed.

"Reactive components" are the polymerizable compounds (such as monomers, macromers, oligomers, prepolymers, and cross-linkers) in the reactive mixture (defined below), as well as any other components in the reactive mixture which are intended to substantially remain in the resultant polymeric network after polymerization and all work-up steps (such as extraction steps) and packaging steps have been completed. Reactive components may be retained in the polymeric network by covalent bonding, hydrogen bonding, electrostatic interactions, the formation of interpenetrating polymeric networks, or any other means. Components that are intended to release from the polymeric network once it is in use are still considered "reactive components." For example, pharmaceutical or nutraceutical components in a contact lens which are intended to be released during wear are considered "reactive components." Components that are intended to be removed from the polymeric network during the manufacturing process (e.g., by extraction), such as diluents, are not "reactive components."

The terms "reactive mixture" and "reactive monomer mixture" refer to the mixture of components which are mixed together and, when subjected to polymerization conditions, result in formation of a polymeric network (such as conventional or silicone hydrogels) as well as biomedical devices, ophthalmic devices, and contact lenses made therefrom. The reactive mixture may comprise reactive components such as monomers, macromers, prepolymers, cross-linkers, and initiators, additives such as wetting agents, polymers, dyes, light absorbing compounds such as UV absorbers, pigments, photochromic compounds, pharmaceutical compounds, and/or nutraceutical compounds, any of which may be polymerizable or non-polymerizable but are capable of being retained within the resulting biomedical device (e.g., contact lens). The reactive mixture may also contain other components which are intended to be removed from the device prior to its use, such as diluents. It will be appreciated that a wide range of additives may be added based upon the contact lens which is made and its intended use. Concentrations of components of the reactive mixture are expressed as weight percentages of all reactive components in the reactive mixture, therefore excluding diluents. When diluents are used, their concentrations are expressed as weight percentages based upon the amount of all components in the reactive mixture (including the diluent).

The term "silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer content to transmit oxygen to the eye.

The term "photochromic" refers to a material which reversibly changes its absorption properties (i.e. color) caused by a photochemical reaction within the material upon exposure to specific wavelengths of electromagnetic radiation. By way of example, a photochromic material may exhibit a reversible change in average transmission of 5% or more, or 10% or more, or 20% percent or more, in the visible portion of the electromagnetic spectrum (e.g., in the wavelength range of about 380 nm to about 760 nm) when exposed to UV or HEV light. A "static" in reference to a chromophore is a material that is not photochromic, thus the material does not undergo a photochemical reaction that reversibly changes its color.

The term "visible light absorbing chromophore" or similar terms refer to chemical moieties that limit transmission of one or more wavelengths of visible light through the lens, for instance in the range of 380 to 760 nm, or preferably 400 to 600 nm. A material's ability to absorb certain wavelengths of light can be determined by measuring its UV/Vis transmission spectrum. Materials that exhibit no absorption at a particular wavelength will exhibit substantially 100 percent transmission at that wavelength. Conversely, materials that completely absorb at a particular wavelength will exhibit substantially 0% transmission at that wavelength. As used herein, "average transmission," "average percent transmission," and related terms may be calculated as the average of the percent transmission in 1 nm increments across the identified range (if no range is identified, then across the 400 to 600 nm range).

As used in this specification, the term "derivative" refers to a moiety that is derived from a parent moiety. For instance, a "derivative" of a visible light absorbing chromophore means a moiety that has been formed by derivatizing the visible light absorbing chromophore. The terms "derivatize," "derive," and similar terms as used herein in the context of a visible light absorbing chromophore and its derivative indicate that the visible light absorbing chromophore is treated under conditions to form the derivative. Such treatment may, for instance, be chemical, photochemical, e-beam, or other means (or combinations thereof). In the invention, the derivatization is preferably performed chemically, such as by chemical oxidation of one or more functional groups in the parent moiety.

As used herein, the term "central zone" refers to the central part of a contact lens and may encompass the pupil region of the lens. The central zone may, for instance, have a diameter ranging from about 3 mm to about 12 mm, preferably from about 5 mm to about 11 mm, more preferably from about 7 mm to about 10 mm. By "peripheral zone" is meant the area of a contact lens circumferentially surrounding the central zone of the lens. The peripheral zone may extend up to the edge of the lens.

The term "multi-functional" refers to a component having two or more polymerizable groups. The term "mono-functional" refers to a component having one polymerizable group.

The terms "halogen" or "halo" indicate fluorine, chlorine, bromine, and iodine.

"Alkyl" refers to an optionally substituted linear or branched alkyl group containing the indicated number of carbon atoms. If no number is indicated, then alkyl (including any optional substituents on alkyl) may contain 1 to 16 carbon atoms. Preferably, the alkyl group contains 1 to 10 carbon atoms, alternatively 1 to 8 carbon atoms, alternatively 1 to 6 carbon atoms, or alternatively 1 to 4 carbon atoms. Examples of alkyl include methyl, ethyl, propyl, isopropyl, butyl, iso-, sec- and tert-butyl, pentyl, hexyl, heptyl, 3-ethylbutyl, and the like. Examples of substituents on alkyl include 1, 2, or 3 groups independently selected from hydroxy, amino, amido, oxa, carboxy, alkyl carboxy, carbonyl, alkoxy, thioalkyl, carbamate, carbonate, halogen, phenyl, benzyl, and combinations thereof. "Alkylene" means a divalent alkyl group, such as —$CH_2$—, —$CH_2CH_2$—, —$CH_2CH_2CH_2$—, —$CH_2CH(CH_3)CH_2$—, and —$CH_2CH_2CH_2CH_2$—.

"Haloalkyl" refers to an alkyl group as defined above substituted with one or more halogen atoms, where each halogen is independently F, Cl, Br or I. A preferred halogen is F. Preferred haloalkyl groups contain 1-6 carbons, more preferably 1-4 carbons, and still more preferably 1-2 carbons. "Haloalkyl" includes perhaloalkyl groups, such as —$CF_3$— or —$CF_2CF_3$—. "Haloalkylene" means a divalent haloalkyl group, such as —$CH_2CF_2$—.

"Cycloalkyl" refers to an optionally substituted cyclic hydrocarbon containing the indicated number of ring carbon atoms. If no number is indicated, then cycloalkyl may contain 3 to 12 ring carbon atoms. Preferred are $C_3$-$C_8$ cycloalkyl groups, $C_3$-$C_7$ cycloalkyl, more preferably $C_4$-$C_7$ cycloalkyl, and still more preferably $C_5$-$C_6$ cycloalkyl. Examples of cycloalkyl include cyclopropyl, cyclobutyl, cyclopentyl, cyclohexyl, cycloheptyl and cyclooctyl. Examples of substituents on cycloalkyl include 1, 2, or 3 groups independently selected from alkyl, hydroxy, amino, amido, oxa, carbonyl, alkoxy, thioalkyl, amido, carbamate, carbonate, halo, phenyl, benzyl, and combinations thereof. "Cycloalkylene" means a divalent cycloalkyl group, such as 1,2-cyclohexylene, 1,3-cyclohexylene, or 1,4-cyclohexylene.

"Heterocycloalkyl" refers to a cycloalkyl ring or ring system as defined above in which at least one ring carbon has been replaced with a heteroatom selected from nitrogen, oxygen, and sulfur. The heterocycloalkyl ring is optionally fused to or otherwise attached to other heterocycloalkyl rings and/or non-aromatic hydrocarbon rings and/or phenyl rings. Preferred heterocycloalkyl groups have from 5 to 7 members. More preferred heterocycloalkyl groups have 5 or 6 members. Heterocycloalkylene means a divalent heterocycloalkyl group.

"Aryl" refers to an optionally substituted aromatic hydrocarbon ring system containing at least one aromatic ring. The aryl group contains the indicated number of ring carbon atoms. If no number is indicated, then aryl may contain 6 to 14 ring carbon atoms. The aromatic ring may optionally be fused or otherwise attached to other aromatic hydrocarbon rings or non-aromatic hydrocarbon rings. Examples of aryl groups include phenyl, naphthyl, and biphenyl. Preferred examples of aryl groups include phenyl. Examples of substituents on aryl include 1, 2, or 3 groups independently selected from alkyl, hydroxy, amino, amido, oxa, carboxy, alkyl carboxy, carbonyl, alkoxy, thioalkyl, carbamate, carbonate, halo, phenyl, benzyl, and combinations thereof. "Arylene" means a divalent aryl group, for example 1,2-phenylene, 1,3-phenylene, or 1,4-phenylene.

"Heteroaryl" refers to an aryl ring or ring system, as defined above, in which at least one ring carbon atom has been replaced with a heteroatom selected from nitrogen, oxygen, and sulfur. The heteroaryl ring may be fused or otherwise attached to one or more heteroaryl rings, aromatic or nonaromatic hydrocarbon rings or heterocycloalkyl rings. Examples of heteroaryl groups include pyridyl, furyl, pyrazinyl, benzimidazolyl, and thienyl. "Heteroarylene" means a divalent heteroaryl group.

"Alkoxy" refers to an alkyl group attached to the parent molecular moiety through an oxygen bridge. Examples of alkoxy groups include, for instance, methoxy, ethoxy, propoxy and isopropoxy. "Thioalkyl" means an alkyl group attached to the parent molecule through a sulfur bridge. Examples of thioalkyl groups include, for instance, methylthio, ethylthio, n-propylthio and iso-propylthio. "Selenoalkyl" means an alkyl group attached to the parent molecule through a selenium bridge. Examples of selenoalkyl groups include, for instance, methylseleno, ethylseleno, n-propylseleno and iso-propylseleno. "Aryloxy" refers to an aryl group attached to a parent molecular moiety through an oxygen bridge. Examples include phenoxy. "Cyclic alkoxy" means a cycloalkyl group attached to the parent moiety through an oxygen bridge.

"Alkylamine" refers to an alkyl group attached to the parent molecular moiety through an —NH bridge. Alkyleneamine means a divalent alkylamine group, such as —$CH_2CH_2NH$—.

"Siloxanyl" refers to a structure having at least one Si—O—Si bond. Thus, for example, siloxanyl group means a group having at least one Si—O—Si group (i.e. a siloxane group), and siloxanyl compound means a compound having at least one Si—O—Si group. "Siloxanyl" encompasses monomeric (e.g., Si—O—Si) as well as oligomeric/polymeric structures (e.g., —[Si—O]$_n$—, where n is 2 or more). Each silicon atom in the siloxanyl group is substituted with independently selected $R^A$ groups (where $R^A$ is as defined in formula A options (b)-(i)) to complete their valence.

"Silyl" refers to a structure of formula $R_3Si$— and "siloxy" refers to a structure of formula $R_3Si$—O—, where each R in silyl or siloxy is independently selected from trimethylsiloxy, $C_1$-$C_8$ alkyl (preferably $C_1$-$C_3$ alkyl, more preferably ethyl or methyl), and $C_3$-$C_5$ cycloalkyl.

"Alkyleneoxy" refers to groups of the general formula -(alkylene-O)$_p$— or —(O-alkylene)$_p$-, wherein alkylene is as defined above, and p is from 1 to 200, or from 1 to 100, or from 1 to 50, or from 1 to 25, or from 1 to 20, or from 1 to 10, wherein each alkylene is independently optionally substituted with one or more groups independently selected from hydroxyl, halo (e.g., fluoro), amino, amido, ether, carbonyl, carboxyl, and combinations thereof. If p is greater than 1, then each alkylene may be the same or different and the alkyleneoxy may be in block or random configuration. When alkyleneoxy forms a terminal group in a molecule, the terminal end of the alkyleneoxy may, for instance, be a hydroxy or alkoxy (e.g., HO—[$CH_2CH_2O$]$_p$— or $CH_3O$—[$CH_2CH_2O$]$_p$—). Examples of alkyleneoxy include polyethyleneoxy, polypropyleneoxy, polybutyleneoxy, and poly(ethyleneoxy-co-propyleneoxy).

"Oxaalkylene" refers to an alkylene group as defined above where one or more non-adjacent $CH_2$ groups have been substituted with an oxygen atom, such as —$CH_2CH_2OCH(CH_3)CH_2$—. "Thiaalkylene" refers to an alkylene group as defined above where one or more non-adjacent $CH_2$ groups have been substituted with a sulfur atom, such as —$CH_2CH_2SCH(CH_3)CH_2$—. "Selenoalkylene" refers to an alkylene group as defined above where one or more non-adjacent $CH_2$ groups have been substituted with a selenium atom, such as —$CH_2CH_2SeCH(CH_3)CH_2$—.

The term "linking group" refers to a moiety that links a polymerizable group to the parent molecule. The linking group may be any moiety that is compatible with the compound of which it is a part, and that does not undesirably interfere with the polymerization of the compound, is stable under the polymerization conditions as well as the conditions for the processing and storage of the final product. For instance, the linking group may be a bond, or it may comprise one or more alkylene, haloalkylene, amide, amine, alkyleneamine, carbamate, ester (—$CO_2$—), arylene, heteroarylene, cycloalkylene, heterocycloalkylene, alkyleneoxy, oxaalkylene, thiaalkylene, haloalkyleneoxy (alkyleneoxy substituted with one or more halo groups, e.g., —$OCF_2$—, —$OCF_2CF_2$—, —$OCF_2CH_2$—), siloxanyl, alkylenesiloxanyl, or combinations thereof. The linking group may optionally be substituted with 1 or more substituent groups. Suitable substituent groups may include those independently selected from alkyl, halo (e.g., fluoro), hydroxyl, HO-alkyleneoxy, MeO-alkyleneoxy, siloxanyl, siloxy, siloxy-alkyleneoxy-, siloxy-alkylene-alkyleneoxy- (where more than one alkyleneoxy groups may be present and wherein each methylene in alkylene and alkyleneoxy is independently optionally substituted with hydroxyl), ether, amine, carbonyl, carbamate, and combinations thereof. The linking group may also be substituted with a polymerizable group, such as (meth)acrylate (in addition to the polymerizable group to which the linking group is linked).

Preferred linking groups include $C_1$-$C_8$ alkylene (preferably $C_2$-$C_6$ alkylene), $C_1$-$C_8$ oxaalkylene (preferably $C_2$-$C_6$ oxaalkylene), $C_1$-$C_8$ thiaalkylene, $C_1$-$C_8$ alkylene-carboxylate-$C_1$-$C_8$ alkylene, $C_1$-$C_8$ alkylene-amide-$C_1$-$C_8$ alkylene, and $C_1$-$C_8$ alkylene-amine-$C_1$-$C_8$ alkylene, each of which is optionally substituted with 1 or 2 groups independently selected from hydroxyl and siloxy.

When the linking group is comprised of combinations of moieties as described above (e.g., alkylene and cycloalkylene), the moieties may be present in any order. For instance, if in Formula A below, L is indicated as being -alkylene-cycloalkylene-, then Rg-L may be either Rg-alkylene-cycloalkylene-, or Rg-cycloalkylene-alkylene-. Notwithstanding this, the listing order represents the preferred order in which the moieties appear in the compound starting from the terminal polymerizable group (Rg or Pg) to which the linking group is attached. For example, if in Formula A, L is indicated as being alkylene-cycloalkylene, then Rg-L is preferably Rg-alkylene-cycloalkylene-.

The linking group may be, or may contain, one or more oxidizable functional groups. Exemplary linking groups as described above that contain oxidizable functional groups include, for instance, thialkylene, alkyleneamine, and selenoalkylene.

The terms "light absorbing compound" refers to a chemical material that absorbs light within the visible spectrum (e.g., in the 380 to 780 nm range). A material's ability to absorb certain wavelengths of light can be determined by measuring its UV/Vis transmission or absorbance spectrum.

When the compounds described herein contain olefinic double bonds or other centers of geometric asymmetry, and unless otherwise specified, it is intended that the compounds include the cis, trans, Z- and E-configurations. Likewise, all tautomeric and salt forms are also intended to be included.

The term "optional substituent" means that a hydrogen atom in the underlying moiety is optionally replaced by a substituent. Any substituent may be used that is sterically practical at the substitution site and is synthetically feasible. Identification of a suitable optional substituent is well within the capabilities of an ordinarily skilled artisan. Examples of an "optional substituent" include, without limitation, $C_1$-$C_6$ alkyl, $C_1$-$C_6$ alkoxy, $C_1$-$C_6$ thioalkyl, $C_1$-$C_6$ selenoalkyl, $C_3$-$C_7$ cycloalkyl, aryl, halo, hydroxy, amino, $NR^4R^5$, benzyl, $SO_3H$, $SO_3Na$, or -L-$P_g$, wherein $R^4$ and $R^5$ are independently H or $C_1$-$C_6$ alkyl, L is a linking group; and $P_g$ is a polymerizable group. The foregoing substituents may be optionally substituted by an optional substituent (which, unless otherwise indicated, is preferably not further substituted). For instance, alkyl may be substituted by halo (resulting, for instance, in $CF_3$).

The term "oxidizable functional group" refers to a functional group capable of undergoing oxidation, such as an increase in oxygen content. Preferred oxidizable functional groups include groups comprising oxidizable sulfur, selenium, and/or nitrogen atoms.

"Substructure" means a compound having the indicated chemical structure as well as any compound that is derived from the indicated chemical structure via the replacement of one or more hydrogen atoms by any other atom or group (which atom or group may be bound to other atoms or groups). Replacement, for instance, may be of one or more, preferably 1 or 3, more preferably 1 to 2, hydrogen atoms with an independently selected optional substituent. Encompassed within the definition of "substructure" are materials wherein the indicated chemical structure forms a fragment of a larger compound, such as a monomer (e.g., containing one or more polymerizable groups), a polymer, a macromolecule, or a polymeric network.

"Visible light absorption maximum" means a wavelength in the visible light wavelength range (380 to 760 nm) at which a light absorbance is a maximum. The definition encompasses materials that exhibit overall absorption maxima outside of the visible light range, such as within the UV region.

As noted above, in one aspect, the invention provides a contact lens. The contact lens comprises a first region; a second region; a visible light absorbing chromophore; and a derivative of the visible light absorbing chromophore, wherein the first region contains the visible light absorbing chromophore and the second region contains the derivative of the visible light absorbing chromophore, and wherein the second region has a greater average percent transmission than the first region across a wavelength range of 400 nm to 600 nm.

The contact lens defines at least a first region and second region. The first and second regions may correspond to various parts of the lens. For example, the first region may correspond to the central zone of the lens, encompassing the lens' pupil region, and the second region may correspond to the peripheral zone of the lens. Alternatively, the second region may correspond to the central zone and the first region may correspond to the peripheral zone.

According to the invention, the lens contains a visible light absorbing chromophore in the first region and a derivative of the visible light absorbing chromophore in the second region. The derivative of the visible light absorbing chromophore exhibits a greater average light transmission across the wavelength range of 400 to 600 nm than the visible light absorbing chromophore. As a consequence, the average percent transmission of the second region of the lens, across the 400 to 600 nm range, is greater than the average percent transmission of the first region. Thus, if the first region corresponds to the central zone of the lens and the second region corresponds to the peripheral zone, the light absorbing chromophore (which may itself exhibit a visible color) is predominantly concentrated in the central region, yielding a lens that may exhibit less color in the peripheral zone. In this way, a more cosmetically pleasing lens may be achieved than would otherwise be obtained if the visible light absorbing chromophore was uniformly distributed throughout the lens.

The visible light absorbing chromophore of the lens of the invention preferably absorbs light in the wavelength range of 380 nm to 760 nm, or 400 to 600 nm, or 400 to 500 nm, or 400 to 470 nm. For instance, the average percent transmission of the visible light absorbing chromophore across the 400 to 600 nm range may be 95 percent or less, or 85 percent or less. By way of further example, the average percent transmission of the visible light absorbing chromophore across the 400 to 500 nm range may be 95 percent or less, or 85 percent or less, or 70 percent or less. By way of still further example, the average percent transmission of the visible light absorbing chromophore across the 400 to 460 nm range may be 95 percent or less, or 85 percent or less, or 70 percent or less, or 60 percent or less. By way of yet further example, the average percent transmission of the visible light absorbing chromophore across the 380 to 450 nm range may be 95 percent or less, or 85 percent or less, or 70 percent or less, or 65 percent or less, or 60 percent or less.

The visible light absorbing chromophore preferably contains an oxidizable functional group. The oxidizable functional group is preferably S, Se, or an amine group.

The visible light absorbing chromophore may be photochromic or it may be static. Exemplary chromophores may include, for instance, a light absorbing functionality selected from: a chromene, a spiropyran, an oxazine, a mercury dithizonate, a fulgide, a fulgimide, an organo-metal dithiozonate, a naphthacenedione, a benzotriazole, an acetophenone, a benzophenone, an azo, a diphenyldiazine, an alkoxy aniline, a tetrahydro-napthalene, an anthraquinone, an anthracene, a dihydroanthracene, a selenoxanthene, a thioxanthene, an acridine, derivatives of the same, or a mixture of two or more thereof.

The visible light absorbing chromophore may, for instance, have a substructure of formula I:

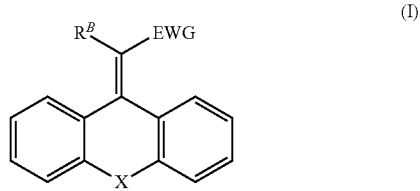

wherein: $R^B$ is —C(=O)H or EWG; X is NR, S or Se; R is H, $C_1$-$C_6$ alkyl, cycloalkyl, heterocycloalkyl, aryl, or heteroaryl; and EWG at each occurrence is independently an electron withdrawing group (such as cyano).

Preferred substructures of formula I include those wherein X is S.

Preferred substructures of formula I include those wherein X is NR.

Preferred substructures of formula I include those wherein X is Se.

Preferred substructures of formula I include those wherein $R^B$ is EWG, preferably cyano. More preferably, EWG at each occurrence is cyano.

Preferred substructures of formula I include those wherein $R^B$ is —C(=O)H.

Typically, because a chromophore as described herein absorbs visible light, it may exhibit a noticeable color to an observer. It is one of the advantages of the invention that, by concentrating the visible light absorbing chromophore in select regions of the lens, for instance in the central zone, and reducing its concentration in other regions, such as the peripheral zone, the presence of the chromophore becomes less noticeable.

In the lens of the invention, the visible light absorbing chromophore is derivatized, in those regions where it is desirable to reduce or eliminate the color of the chromophore, to a form that exhibits greater average visible light transmission, for instance in the 400 to 600 nm range, than the parent chromophore. The derivative, therefore, may exhibit less noticeable, or even no, color to an observer. For example, the average percent transmission of the derivative across the wavelength range of 400 to 600 nm (or 400 to 500 nm, or 400 to 460 nm, or 380 to 450 nm) may be at least 5 percent greater, or at least 10 percent greater, or at least 15 percent greater, or at least 20 percent greater, or at least 30 percent greater, or at least 40 percent greater, or at least 50 percent greater, than the average percent transmission of the visible light absorbing chromophore across the same wavelength range.

The derivative of the visible light absorbing chromophore may be an oxidized derivative of the visible light absorbing chromophore. For example, the derivative may contain groups such as $N^+RO^-$, SO, $SO_2$, SeO or $SeO_2$ (where R is, for instance, H, $C_1$-$C_6$ alkyl, cycloalkyl, heterocycloalkyl, aryl, or heteroaryl).

The derivative may have a substructure of formula II, for instance if the visible light absorbing chromophore present in the lens has a substructure of formula I as described above:

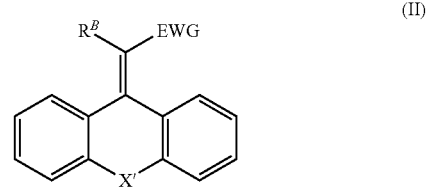

wherein: $R^B$ is —C(=O)H or EWG; X' is $N^+RO^-$, SO, $SO_2$, SeO or $SeO_2$; R is H, $C_1$-$C_6$ alkyl, cycloalkyl, heterocycloalkyl, aryl, or heteroaryl; and EWG at each occurrence is independently an electron withdrawing group (such as cyano).

Preferred substructures of formula II include those wherein X' is SO.

Preferred substructures of formula II include those wherein X' is $SO_2$.

Preferred substructures of formula II include those wherein X' is a mixture of SO and $SO_2$.

Preferred substructures of formula II include those wherein X' is SeO.

Preferred substructures of formula II include those wherein X' is $SeO_2$.

Preferred substructures of formula II include those wherein X' is a mixture of SeO and $SeO_2$. Preferred substructures of formula II include those wherein X' is $N^+RO^-$.

Preferred substructures of formula II include those wherein $R^B$ is EWG, preferably cyano. More preferably, EWG at each occurrence is cyano.

Preferred substructures of formula II include those wherein $R^B$ is —C(=O)H.

As noted above, the invention also provides a method for making a contact lens as described herein. The method comprises: providing a lens precursor having a first region and a second region and containing a visible light absorbing chromophore in the first region and the second region; and selectively derivatizing the visible light absorbing chromophore within the second region to form a derivative of the visible light absorbing chromophore, the derivative having a greater average percent transmission than the visible light absorbing chromophore across a wavelength range of 400 nm to 600 nm.

The lens precursor for use in the method may simply be any of the contact lenses described above that further contains a visible light absorbing chromophore. For instance, the lens precursor may be a material selected from any of the following (and containing a visible light absorbing chromophore): etafilcon, genfilcon, hilafilcon, lenefilcon, nesofilcon, omafilcon, polymacon, vifilcon, acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, or any of their variants. Preferably, the lens precursor is either a conventional hydrogel containing a visible light absorbing chromophore, or it is a silicone hydrogel containing a visible light absorbing chromophore. More preferably it is a silicone hydrogel containing a visible light absorbing chromophore.

A lens precursor for use in the invention may be a polymerization reaction product of a reactive mixture comprising: (a) a chromophore-containing monomer; and (b) a monomer suitable for making the contact lens precursor. Exemplary contact lens precursors that may be used in the invention, as well as chromophore-containing monomers, are described in U.S. Pat. No. 10,935,695, patent publications US20200407324 and US20200407337, and in applicant's co-pending U.S. application Ser. No. 17/456,659, filed Nov. 29, 2021, each of which is incorporated herein by reference in its entirety.

For instance, the chromophore-containing monomer may comprise a compound of formula III:

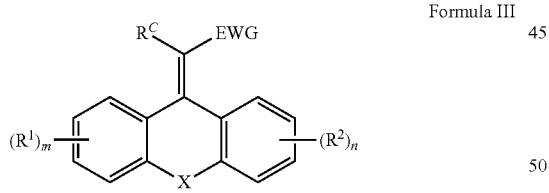

Formula III wherein:
m and n are independently 0, 1, 2, 3, or 4;
$R^C$ is EWC or a group of formula -T-Y—$P_g$, wherein T is a bond, O, or NR, Y is a linking group, and $P_g$ is a polymerizable group;
X is O, NR, S or Se;
R at each occurrence is independently H, $C_1$-$C_6$ alkyl, cycloalkyl, heterocycloalkyl, aryl, heteroaryl, or Y—$P_g$;
$R^1$ and $R^2$, when present, are independently at each occurrence $C_1$-$C_6$ alkyl, $C_1$-$C_6$ alkoxy, $C_1$-$C_6$ thioalkyl, $C_1$-$C_6$ selenoalkyl, $C_3$-$C_7$ cycloalkyl, aryl, halo, hydroxy, amino, $NR^3R^4$, benzyl, or —Y—$P_g$, wherein $R^3$ and $R^4$ are independently H or $C_1$-$C_6$ alkyl, or two adjacent $R^1$ or $R_2$ groups, together with the carbon atoms to which they are attached, combine to form a cycloalkyl or aryl ring; and
EWG at each occurrence is independently an electron withdrawing group, wherein the compound of formula III contains at least one $P_g$ group and at least one oxidizable functional group.

The chromophore-containing monomer may comprise a compound of formula IV:

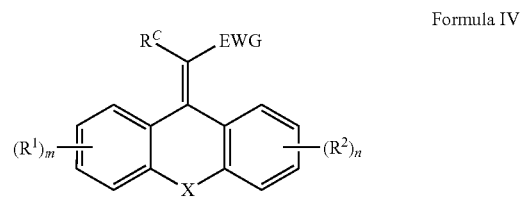

Formula IV wherein:
m and n are independently 0, 1, 2, 3, or 4;
$R^C$ is EWC or a group of formula -T-Y—$P_g$, wherein T is a bond, O, or NR, Y is a linking group, and $P_g$ is a polymerizable group;
X is NR, S or Se;
R at each occurrence is independently H, $C_1$-$C_6$ alkyl, cycloalkyl, heterocycloalkyl, aryl, heteroaryl, or Y—$P_g$;
$R^1$ and $R^2$, when present, are independently at each occurrence $C_1$-$C_6$ alkyl, $C_1$-$C_6$ alkoxy, $C_1$-$C_6$ thioalkyl, $C_1$-$C_6$ selenoalkyl, $C_3$-$C_7$ cycloalkyl, aryl, halo, hydroxy, amino, $NR^3R^4$, benzyl, or —Y—$P_g$, wherein $R^3$ and $R^4$ are independently H or $C_1$-$C_6$ alkyl, or two adjacent $R^1$ or $R_2$ groups, together with the carbon atoms to which they are attached, combine to form a cycloalkyl or aryl ring; and
EWG at each occurrence is independently an electron withdrawing group, wherein the compound of formula III contains at least one $P_g$ group.

The chromophore-containing monomer may comprise a compound of formula V:

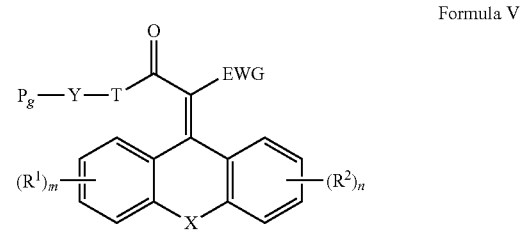

Formula V wherein:
m and n are independently 0, 1, 2, 3, or 4;
T is a bond, O, or NR;
X is NR, S, or Se;
Y is a linking group;
$P_g$ is a polymerizable group;
R at each occurrence is independently H, $C_1$-$C_6$ alkyl, cycloalkyl, heterocycloalkyl, aryl, heteroaryl, or Y—$P_g$;
$R^1$ and $R^2$, when present, are independently at each occurrence $C_1$-$C_6$ alkyl, $C_1$-$C_6$ alkoxy, $C_1$-$C_6$ thioalkyl, $C_1$-$C_6$ selenoalkyl, $C_3$-$C_7$ cycloalkyl, aryl, halo, hydroxy, amino, $NR^3R^4$, or benzyl, wherein $R^3$ and $R^4$ are independently H or $C_1$-$C_6$ alkyl, or two adjacent $R^1$ or $R^2$ groups, together with the carbon atoms to which they are attached, combine to form a cycloalkyl or aryl ring; and EWG is an electron withdrawing group.

Preferred compounds of formula V include those wherein Y at each occurrence is independently alkylene, cycloalkylene, heterocycloalkylene, arylene, heteroarylene, oxaalkylene, alkylene-amide-alkylene, alkylene-amine-alkylene, or combinations thereof.

Preferred compounds of formula V include those wherein $P_g$ comprises styryl, vinyl carbonate, vinyl ether, vinyl carbamate, N-vinyl lactam, N-vinylamide, (meth)acrylate, or (meth)acrylamide.

Preferred compounds of formula V include those wherein X is N.

Preferred compounds of formula V include those wherein X is S.

Preferred compounds of formula V include those wherein EWG at each occurrence is independently cyano, amide, ester, keto, or aldehyde. More preferably, EWG at each occurrence is cyano.

Preferred compounds of formula V include those wherein m and n are each zero.

The chromophore-containing monomer may comprise a compound of formula VI:

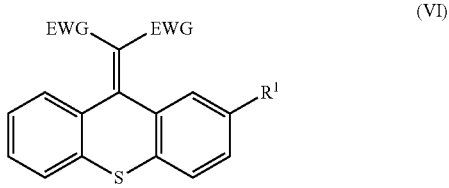

(VI)

wherein EWG at each occurrence is independently an electron withdrawing group; and $R^1$ is Y—$P_g$, Y is a linking group; and $P_g$ is a polymerizable group.

Preferred compounds of formula VI include those wherein $P_g$ (a polymerizable group) comprises styryl, vinyl carbonate, vinyl ether, vinyl carbamate, N-vinyl lactam, N-vinylamide, (meth)acrylate, or (meth)acrylamide. Preferred polymerizable groups include (meth)acrylate or (meth)acrylamide. A more preferred polymerizable group is methacrylate.

Preferred compounds of formula VI include those wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ oxaalkylene, or $C_2$-$C_4$ oxaalkylene, or oxaethylene (—O—$CH_2CH_2$—).

Preferred compounds of formula VI include those wherein EWG at each occurrence is independently cyano, amide, ester, keto, or aldehyde. EWG at each occurrence may be cyano.

The chromophore-containing monomer may comprise a compound of formula VII:

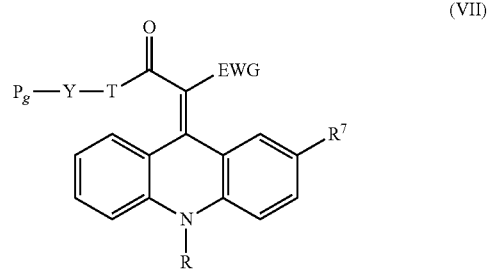

(VII)

wherein:

T is a bond, O, or $NR^6$, wherein $R^6$ is H, $C_1$-$C_6$ alkyl, cycloalkyl, heterocycloalkyl, aryl, or heteroaryl;

R is H, $C_1$-$C_6$ alkyl, cycloalkyl, heterocycloalkyl, aryl, or heteroaryl;

Y is a linking group;

$P_g$ is a polymerizable group;

$R^7$ is H, $C_1$-$C_6$ alkyl, $C_1$-$C_6$ alkoxy, $C_1$-$C_6$ thioalkyl, $C_1$-$C_6$ selenoalkyl, $C_3$-$C_7$ cycloalkyl, aryl (preferably unsubstituted phenyl or phenyl substituted with alkyl or halo), halo, hydroxy, amino, $NR^3R^4$, benzyl, $SO_3H$, or $SO_3M$ (M is a monovalent cation, such as sodium or potassium), wherein $R^3$ and $R^4$ are independently H or $C_1$-$C_6$ alkyl; and EWG is an electron withdrawing group.

Preferred compounds of formula VII include those wherein $R^7$ is H.

Preferred compounds of formula VII include those wherein $R^7$ is $C_1$-$C_6$ alkyl, $C_1$-$C_6$ alkoxy, or $C_1$-$C_6$ thioalkyl.

Preferred compounds of formula VII include those wherein $R^7$ is $C_1$-$C_6$ alkoxy, such as ethoxy or methoxy, preferably methoxy.

Preferred compounds of formula VII include those wherein R is H, or $C_1$-$C_6$ alkyl. Preferably, R is $C_1$-$C_6$ alkyl, such as methyl, ethyl, n-propyl, iso-propyl, n-butyl, t-butyl, or sec-butyl. Preferably, R is n-propyl or n-butyl.

Preferred compounds of formula VII include those wherein T is $NR^6$, and $R^6$ is H, or $C_1$-$C_6$ alkyl. Preferably, $R^6$ is H.

Preferred compounds of formula VII include those wherein $P_g$ (a polymerizable group) at each occurrence independently comprises styryl, vinyl carbonate, vinyl ether, vinyl carbamate, N-vinyl lactam, N-vinylamide, (meth)acrylate, or (meth)acrylamide. Preferred polymerizable groups include (meth)acrylate or (meth)acrylamide. A more preferred polymerizable group is methacrylate.

Preferred compounds of formula VII include those wherein Y (a linking group) is alkylene, cycloalkylene, heterocycloalkylene, arylene (e.g., phenylene), heteroarylene, oxaalkylene, alkylene-amide-alkylene, alkylene-amine-alkylene, or combinations of any of the foregoing groups. Preferred linking groups include $C_1$-$C_8$ alkylene (e.g., ethylene or propylene), $C_1$-$C_8$ oxaalkylene, $C_1$-$C_8$ alkylene-amide-$C_1$-$C_8$ alkylene, and $C_1$-$C_8$ alkylene-amine-$C_1$-$C_8$ alkylene. Particularly preferred is $C_1$-$C_8$ alkylene, especially ethylene (—$CH_2CH_2$—). When T in the compound of formula VI is O, it is preferred that the carbon atom of the linking group to which the O is attached be hindered. For instance, if T is O and Y is alkylene, a preferred alkylene is —$C(R^H)_2(CH_2)_x$—, where $R^H$ is independently $C_1$-$C_6$ alkyl (preferably independently methyl or ethyl) and x is from 1 to 5.

Preferred compounds of formula VII include those wherein T is a bond or is $NR^6$ (preferably NH).

Preferred compounds of formula VII include those wherein EWG is cyano, amide, ester, keto, or aldehyde. Preferably, EWG is cyano.

The chromophore-containing monomer may comprise a compound of formula VIII:

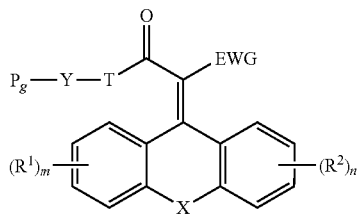

Formula VIII wherein:
- m and n are independently 0, 1, 2, 3, or 4;
- T is a bond, O, or NR;
- X is O, NR, S, or Se;
- Y is a linking group;
- $P_g$ is a polymerizable group;
- R at each occurrence is independently H, $C_1$-$C_6$ alkyl, cycloalkyl, heterocycloalkyl, aryl, heteroaryl, or Y—$P_g$;
- $R^1$ and $R^2$, when present, are independently at each occurrence $C_1$-$C_6$ alkyl, $C_1$-$C_6$ alkoxy, $C_1$-$C_6$ thioalkyl, $C_1$-$C_6$ selenoalkyl, $C_3$-$C_7$ cycloalkyl, aryl, halo, hydroxy, amino, $NR^3R^4$, or benzyl, wherein $R^3$ and $R^4$ are independently H or $C_1$-$C_6$ alkyl, or two adjacent $R^1$ or $R_2$ groups, together with the carbon atoms to which they are attached, combine to form a cycloalkyl or aryl ring, provided that at least one of $R^1$ and $R^2$ contains an oxidizable functional group; and
- EWG is an electron withdrawing group.

Preferred compounds of formula VIII include those wherein Y at each occurrence is independently alkylene, thiaalkylene, selenoalkylene, alkyleneamine, cycloalkylene, heterocycloalkylene, arylene, heteroarylene, oxaalkylene, alkylene-amide-alkylene, alkylene-amine-alkylene, or combinations thereof.

Preferred compounds of formula VIII include those wherein $P_g$ comprises styryl, vinyl carbonate, vinyl ether, vinyl carbamate, N-vinyl lactam, N-vinylamide, (meth)acrylate, or (meth)acrylamide.

Preferred compounds of formula VIII include those wherein X is N.

Preferred compounds of formula VIII include those wherein X is S.

Preferred compounds of formula VIII include those wherein X is O.

Preferred compounds of formula VIII include those wherein m is 0 and n is 1.

Preferred compounds of formula VIII include those wherein m is 0, n is 1, and $R^2$ contains an oxidizable functional group. Preferably, $R^2$ comprises S, Se, NH, thiaalkyl, selenoalkyl, alkylamine, thiaalkylene, selenoalkylene, or alkyleneamine.

Preferred compounds of formula VIII include those wherein EWG at each occurrence is independently cyano, amide, ester, keto, or aldehyde. More preferably, EWG at each occurrence is cyano.

Preferred chromophore-containing monomers include the following, including mixtures of two or more thereof:

2-(2-cyano-2-(9H-thioxanthen-9-ylidene)acetamido)ethyl methacrylate;
2-(2-cyano-2-(9H-thioxanthen-9-ylidene)acetamido)ethyl acrylate;
N-(2-(2-cyano-2-(9H-thioxanthen-9-ylidene)acetamido)ethyl)methacrylamide;
N-(2-(2-cyano-2-(9H-thioxanthen-9-ylidene)acetamido)ethyl)acrylamide;
2-(2-cyano-N-methyl-2-(9H-thioxanthen-9-ylidene)acetamido)ethyl methacrylate;
2-cyano-2-(9H-thioxanthen-9-ylidene)-N-(2-(N-vinylacetamido)ethyl)acetamide;
2-(2-(acridin-9(10H)-ylidene)-2-cyanoacetamido)ethyl acrylate;
N-(2-(2-(acridin-9(10H)-ylidene)-2-cyanoacetamido)ethyl)methacrylamide;
N-(2-(2-(acridin-9(10H)-ylidene)-2-cyanoacetamido)ethyl)acrylamide;
2-(2-(acridin-9(10H)-ylidene)-2-cyano-N-methylacetamido)ethyl methacrylate;
2-(acridin-9(10H)-ylidene)-2-cyano-N-(2-(N-vinylacetamido)ethyl)acetamide;
2-(2-cyano-2-(9H-thioxanthen-9-ylidene)acetamido)-2-methylpropyl methacrylate;
(Z)-2-(2-cyano-2-(3-hydroxyacridin-9(10H)-ylidene)acetamido)ethyl methacrylate;
2-(2-cyano-2-(10-methylacridin-9(10H)-ylidene)acetamido)ethyl methacrylate;
2-(2-cyano-2-(3,6-dihydroxyacridin-9(10H)-ylidene)acetamido)ethyl methacrylate;
(E)-2-(2-cyano-2-(2,4-dichloro-9H-thioxanthen-9-ylidene)acetamido)ethyl methacrylate;
(E)-2-(2-(2-chloro-9H-thioxanthen-9-ylidene)-2-cyanoacetamido)ethyl methacrylate;
(E)-2-(2-cyano-2-(2-isopropyl-9H-thioxanthen-9-ylidene)acetamido)ethyl methacrylate;
(E)-2-(2-cyano-2-(4-isopropyl-9H-thioxanthen-9-ylidene)acetamido)ethyl methacrylate;.
2-(3-oxo-2-(9H-thioxanthen-9-ylidene)propanamido)ethyl methacrylate;
2-(3-oxo-2-(9H-thioxanthen-9-ylidene)butanamido)ethyl methacrylate;
2-(3-methoxy-3-oxo-2-(9H-thioxanthen-9-ylidene)propanamido)ethyl methacrylate;
2-(3-amino-3-oxo-2-(9H-thioxanthen-9-ylidene)propanamido)ethyl methacrylate;
2-(2-cyano-2-(10,10-dioxido-9H-thioxanthen-9-ylidene)acetamido)ethyl methacrylate;
N-(2-(2-cyano-2-(10-methylacridin-9(10H)ylidene)acetamido)ethyl) methacrylamide;
2-(2-cyano-2-(9H-thioxanthen-9-ylidene)acetoxy)ethyl methacrylate;
2-(2-cyano-2-(2-methoxy-10-propylacridin-9(10H)-ylidene)acetamido)ethyl methacrylate;
N-(2-(2-cyano-2-(10-methylacridin-9(10H)-ylidene)acetamido)ethyl)methacrylamide;
2-(2-(10-butyl-2-methoxyacridin-9(10H)-ylidene)-2-cyanoacetamido)ethyl methacrylate;
2-((9-(dicyanomethylene)-9H-thioxanthen-2-yl)oxy)ethyl methacrylate;
2-(2-cyano-2-(3-(propylthio)-9H-thioxanthen-9-ylidene)acetamido)ethyl methacrylate;
2-(2-cyano-2-(3-(propylthio)-9H-xanthen-9-ylidene)acetamido)ethyl methacrylate;
3-((9-(1-cyano-2-((2-(methacryloyloxy)ethyl)amino)-2-oxoethylidene)-9H-thioxanthen-3-yl)thio)propyl methacrylate;
3-((9-(1-cyano-2-((2-(methacryloyloxy)ethyl)amino)-2-oxoethylidene)-9H-xanthen-3-yl)thio)propyl methacrylate;
3-((9-(dicyanomethylene)-9H-thioxanthen-3-yl)thio)propyl methacrylate;
3-((9-(dicyanomethylene)-9H-xanthen-3-yl)thio)propyl methacrylate; or
a mixture of two or more thereof.

Other chromophore-containing monomers that may be used in making the lens precursor of the invention include, without limitation: chromenes, such as naphthopyrans, benzopyrans, indenonaphthopyrans and phenanthropyrans; spiropyrans, such as spiro (benzindoline) naphthopyrans, spiro (indoline) benzopyrans, spiro (indoline) naphthopyrans, spiro (indoline) quinopyrans and spiro (indoline) pyrans; oxazines, such as spiro (indoline) naphthoxazines, spiro (indoline) pyridobenzoxazines, spiro (benzindoline) pyridobenzoxazines, spiro (benzindoline) naphthoxazines and spiro (indoline) benzoxazines; mercury dithizonates, fulgides, fulgimides and mixtures of such monomers.

Additional suitable chromophore-containing monomers include, without limitation: organo-metal dithiozonates, such as (arylazo)-thioformic arylhydrazidates, e.g., mercury dithizonates; and fulgides and fulgimides, naphthoxazines, spirobenzopyrans; polymerizable spirobenzopyrans and spirobenzopyrans; polymerizable fulgides; polymerizable naphthacenediones; polymerizable spirooxazines; and polymerizable polyalkoxylated napthopyrans. The monomers may be used alone or in combination with one or more other chromophore-containing monomers.

Other chromophore-containing monomers are disclosed in U.S. Pat. No. 7,556,750, the disclosure of which is incorporated by reference. Non-limiting examples of suitable monomers include naphthopyrans. The monomers may include polymerizable functional groups such that they are copolymerized into the resulting contact lens precursor. Examples of polymerizable functional groups include (meth)acrylates, (meth)acrylamides, vinyls and the like.

Still other useful chromophore-containing monomers include indeno-fused naphthopyrans chosen from an indeno [2',3':3,4]naphtho[1,2-b]pyran and an indeno[1',2':4,3]naphtho[2,1-b]pyran, which are more specifically disclosed in US2009/0072206 and US2006/0226401 and those cited in U.S. Pat. No. 7,364,291, and combinations thereof. A preferred chromophore-containing monomers is 4-[4-[3,13-dihydro-6-methoxy-13,13-dimethyl-3-phenyl-7-(1-piperidinyl)benzo[3,4]fluoreno[2,1-b]pyran-3-yl]phenyl]-γ-oxo-, 2-[(2-methyl-1-oxo-2-propen-1-yl)oxy]ethyl ester 1-piperazinebutanoic acid (reg. no. 1339922-40-5) shown below.

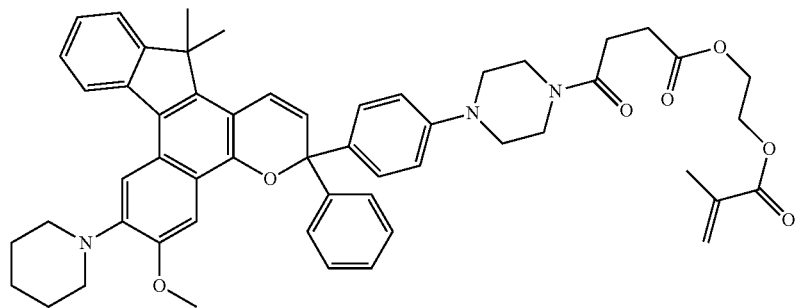 [SMILES: C=C(C)C(=O)OCCOC(=O)CCC(=O)N1CCN(c2ccc(C3(c4ccccc4)C=Cc4c5c(c6cc(N7CCCCC7)c(OC)cc6c4O3)-c3ccccc3C5(C)C)cc2)CC1]

The chromophore-containing monomer may comprise a mixture of two or more of the foregoing compounds. For example, the chromophore-containing monomer may comprise a mixture of a compound of formula III wherein X is S and a compound of formula III where X is NR. By way of further example, the chromophore-containing monomer may comprise a mixture of a compound of formula V wherein X is S and a compound of formula VII. Or the chromophore-containing monomer may comprise a mixture of 2-(2-cyano-2-(9H-thioxanthen-9-ylidene)acetamido) ethyl methacrylate and 2-(2-(10-butyl-2-methoxyacridin-9 (10H)-ylidene)-2-cyanoacetamido)ethyl methacrylate. Or the chromophore-containing monomer may comprise a mixture of 2-(2-cyano-2-(9H-thioxanthen-9-ylidene)acetamido) ethyl methacrylate and N-(2-(2-cyano-2-(10-methylacridin-9(10H)-ylidene)acetamido)ethyl)methacrylamide.

Formation of Contact Lens Precursor

In order to form the contact lens precursor for use in the invention, the chromophore-containing monomer is co-polymerized with one or more monomers suitable for making the contact lens precursor. The monomers may generally be added to a reactive mixture from which a polymeric network is formed. The chromophore-containing monomer may be present in the reactive mixture in any amount up to the limit of its solubility. For instance, the chromophore-containing monomer may be present at concentration of least 0.1 percent, or at least 1 percent, or at least 2 percent; and up to 10 percent or up to 5 percent, based on the weight percentages of all components in the reactive mixture, excluding diluent. A typical concentration may be in the range of 1 to 5 percent. The upper limit is typically determined by the solubility of the compound with other co-monomers and or diluents in the reactive monomer mix.

Co-polymerization conditions for forming contact lens precursors as described herein, including the typical types of monomers, initiators, diluents, etc., are well known to those skilled in the art and described, for instance, in the above-referenced patent documents.

Thus, for example, contact lens precursors for use in the invention may comprise a free radical reaction product of a reactive mixture containing one or more monomers suitable for making the contact lens precursor (also referred to herein as device forming monomers or hydrogel forming monomers), one or more chromophore-containing monomers, and optional components. When polymerized, the reactive mixture results in formation of a polymeric network of which the contact lens precursor may be comprised. The polymeric network may, for instance, be a hydrogel (e.g., a conventional hydrogel or a silicone hydrogel).

Non-limiting examples of polymeric networks in which a chromophore-containing monomer may be incorporated include the materials described above, for instance etafilcon, genfilcon, hilafilcon, lenefilcon, nesofilcon, omafilcon, polymacon, vifilcon, acquafilcon, asmofilcon, balafilcon, comfilcon, delefilcon, enfilcon, fanfilcon, formofilcon, galyfilcon, lotrafilcon, narafilcon, riofilcon, samfilcon, senofilcon, somofilcon, and stenfilcon, or any of their variants.

By way of further example, a polymeric network may be made from a reactive mixture comprising one or more of: hydrophilic components, hydrophobic components, silicone-containing components, wetting agents such as polyamides, crosslinking agents, and further components such as diluents and initiators. As discussed above, the reactive mixture also includes a chromophore-containing monomer. Examples of various monomers and other materials for making polymeric networks of which a lens precursor of the invention may be comprised are as follows.

Hydrophilic Components

Examples of suitable families of hydrophilic monomers that may be present in the reactive mixture include (meth) acrylates, styrenes, vinyl ethers, (meth)acrylamides, N-vinyl lactams, N-vinyl amides, N-vinyl imides, N-vinyl ureas, O-vinyl carbamates, O-vinyl carbonates, other hydrophilic vinyl compounds, and mixtures thereof.

Non-limiting examples of hydrophilic (meth)acrylate and (meth)acrylamide monomers include: acrylamide, N-isopropyl acrylamide, N,N-dimethylaminopropyl (meth)acrylamide, N,N-dimethyl acrylamide (DMA), 2-hydroxyethyl methacrylate (HEMA), 2-hydroxypropyl (meth)acrylate, 3-hydroxypropyl (meth)acrylate, 2,3-dihydroxypropyl (meth)acrylate, 2-hydroxybutyl (meth)acrylate, 3-hydroxybutyl (meth)acrylate, 4-hydroxybutyl (meth)acrylate, N-(2-hydroxyethyl) (meth)acrylamide, N,N-bis(2-hydroxyethyl) (meth)acrylamide, N-(2-hydroxypropyl) (meth)acrylamide, N,N-bis(2-hydroxypropyl) (meth)acrylamide, N-(3-hydroxypropyl) (meth)acrylamide, N-(2-hydroxybutyl) (meth) acrylamide, N-(3-hydroxybutyl) (meth)acrylamide, N-(4-hydroxybutyl) (meth)acrylamide, 2-aminoethyl (meth) acrylate, 3-aminopropyl (meth)acrylate, 2-aminopropyl (meth)acrylate, N-2-aminoethyl (meth)acrylamides), N-3-aminopropyl (meth)acrylamide, N-2-aminopropyl (meth) acrylamide, N,N-bis-2-aminoethyl (meth)acrylamides, N,N-bis-3-aminopropyl (meth)acrylamide), N,N-bis-2-aminopropyl (meth)acrylamide, glycerol methacrylate, polyethyleneglycol monomethacrylate, (meth)acrylic acid, vinyl acetate, acrylonitrile, and mixtures thereof.

Hydrophilic monomers may also be ionic, including anionic, cationic, zwitterions, betaines, and mixtures thereof. Non-limiting examples of such charged monomers include (meth)acrylic acid, N-[(ethenyloxy)carbonyl]-β-alanine (VINAL), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT), 1-propanaminium, N,N-dimethyl-N-[3-[(1-oxo-2-propen-1-yl) amino]propyl]-3-sulfo-, inner salt (SBT), 3,5-Dioxa-8-aza-4-phosphaundec-10-en-1-aminium, 4-hydroxy-N,N,N-trimethyl-9-oxo-, inner salt, 4-oxide (9CI) (PBT), 2-methacryloyloxyethyl phosphorylcholine, 3-(dimethyl(4-vinylbenzyl)ammonio)propane-1-sulfonate (DMVBAPS), 3-((3-acrylamidopropyl)dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), and methacryloyloxy)propyl) dimethylammonio)propane-1-sulfonate (MAPDAPS).

Non-limiting examples of hydrophilic N-vinyl lactam and N-vinyl amide monomers include: N-vinyl pyrrolidone (NVP), N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, N-vinyl acetamide (NVA), N-vinyl-N-methylacetamide (VMA), N-vinyl-N-ethyl acetamide, N-vinyl-N-ethyl formamide, N-vinyl formamide, N-vinyl-N-methylpropionamide, N-vinyl-N-methyl-2-methylpropionamide, N-vinyl-2-methylpropionamide, N-vinyl-N,N'-dimethylurea, 1-methyl-3-methylene-2-pyrrolidone, 1-methyl-5-methylene-2-pyrrolidone, 5-methyl-3-methylene-2-pyrrolidone; 1-ethyl-5-methylene-2-pyrrolidone, N-methyl-3-methylene-2-pyrrolidone, 5-ethyl-3-methylene-2-pyrrolidone, 1-N-propyl-3-methylene-2-pyrrolidone, 1-N-propyl-5-methylene-2-pyrrolidone, 1-isopropyl-3-methylene-2-pyrrolidone, 1-isopropyl-5-methylene-2-pyrrolidone, N-vinyl-N-ethyl acetamide, N-vinyl-N-ethyl formamide, N-vinyl formamide, N-vinyl isopropylamide, N-vinyl caprolactam, N-vinylimidazole, and mixtures thereof Non-limiting examples of hydrophilic O-vinyl carbamates and O-vinyl carbonates monomers include N-2-hydroxyethyl vinyl carbamate and N-carboxy-β-alanine N-vinyl ester. Further examples of hydrophilic vinyl carbonate or vinyl carbamate monomers are disclosed in U.S. Pat. No. 5,070,215. Hydrophilic oxazolone monomers are disclosed in U.S. Pat. No. 4,910,277.

Other hydrophilic vinyl compounds include ethylene glycol vinyl ether (EGVE), di(ethylene glycol) vinyl ether (DEGVE), allyl alcohol, and 2-ethyl oxazoline.

The hydrophilic monomers may also be macromers or prepolymers of linear or branched poly(ethylene glycol), poly(propylene glycol), or statistically random or block copolymers of ethylene oxide and propylene oxide, having polymerizable moieties such as (meth)acrylates, styrenes, vinyl ethers, (meth)acrylamides, N-vinylamides, and the like. The macromers of these polyethers have one polymerizable group; the prepolymers may have two or more polymerizable groups.

The preferred hydrophilic monomers of the present invention are DMA, NVP, HEMA, VMA, NVA, and mixtures thereof. Preferred hydrophilic monomers include mixtures of DMA and HEMA. Other suitable hydrophilic monomers will be apparent to one skilled in the art.

Generally, there are no particular restrictions with respect to the amount of the hydrophilic monomer present in the reactive monomer mixture. The amount of the hydrophilic monomers may be selected based upon the desired characteristics of the resulting hydrogel, including water content, clarity, wettability, protein uptake, and the like. Wettability may be measured by contact angle, and desirable contact angles are less than about 100°, less than about 80°, and less than about 60°. The hydrophilic monomer may be present in an amount in the range of, for instance, about 0.1 to about 100 weight percent, alternatively in the range of about 1 to about 80 weight percent, alternatively about 5 to about 65 weight percent, alternatively in the range of about 40 to about 60 weight percent, or alternatively about 55 to about 60 weight percent, based on the total weight of the reactive components in the reactive monomer mixture.

Silicone-Containing Components

Silicone-containing components suitable for use in the invention comprise one or more polymerizable compounds, where each compound independently comprises at least one polymerizable group, at least one siloxane group, and one or more linking groups connecting the polymerizable group(s) to the siloxane group(s). The silicone-containing components may, for instance, contain from 1 to 220 siloxane repeat units, such as the groups defined below. The silicone-containing component may also contain at least one fluorine atom.

The silicone-containing component may comprise: one or more polymerizable groups as defined above; one or more optionally repeating siloxane units; and one or more linking groups connecting the polymerizable groups to the siloxane units. The silicone-containing component may comprise:

one or more polymerizable groups that are independently a (meth)acrylate, a styryl, a vinyl ether, a (meth)acrylamide, an N-vinyl lactam, an N-vinylamide, an O-vinylcarbamate, an O-vinylcarbonate, a vinyl group, or mixtures of the foregoing; one or more optionally repeating siloxane units; and one or more linking groups connecting the polymerizable groups to the siloxane units.

The silicone-containing component may comprise: one or more polymerizable groups that are independently a (meth) acrylate, a (meth)acrylamide, an N-vinyl lactam, an N-vinylamide, a styryl, or mixtures of the foregoing; one or more optionally repeating siloxane units; and one or more linking groups connecting the polymerizable groups to the siloxane units.

The silicone-containing component may comprise: one or more polymerizable groups that are independently a (meth) acrylate, a (meth)acrylamide, or mixtures of the foregoing; one or more optionally repeating siloxane units; and one or more linking groups connecting the polymerizable groups to the siloxane units.

The silicone-containing component may comprise one or more polymerizable compounds of Formula A:

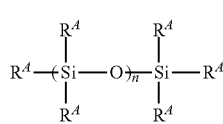

Formula A wherein:
at least one $R^A$ is a group of formula $R_g$-L- wherein $R_g$ is a polymerizable group and L is a linking group, and the remaining $R^A$ are each independently:
(a) $R_g$-L-,
(b) $C_1$-$C_{16}$ alkyl optionally substituted with one or more hydroxy, amino, amido, oxa, carboxy, alkyl carboxy, carbonyl, alkoxy, amido, carbamate, carbonate, halo, phenyl, benzyl, or combinations thereof,
(c) $C_3$-$C_{12}$ cycloalkyl optionally substituted with one or more alkyl, hydroxy, amino, amido, oxa, carbonyl, alkoxy, amido, carbamate, carbonate, halo, phenyl, benzyl, or combinations thereof,
(d) a $C_6$-$C_{14}$ aryl group optionally substituted with one or more alkyl, hydroxy, amino, amido, oxa, carboxy, alkyl carboxy, carbonyl, alkoxy, amido, carbamate, carbonate, halo, phenyl, benzyl, or combinations thereof,
(e) halo,
(f) alkoxy, cyclic alkoxy, or aryloxy,
(g) siloxy,
(h) alkyleneoxy-alkyl or alkoxy-alkyleneoxy-alkyl, such as polyethyleneoxyalkyl, polypropyleneoxyalkyl, or poly(ethyleneoxy-co-propyleneoxyalkyl), or
(i) a monovalent siloxane chain comprising from 1 to 100 siloxane repeat units optionally substituted with alkyl, alkoxy, hydroxy, amino, oxa, carboxy, alkyl carboxy, alkoxy, amido, carbamate, halo or combinations thereof; and n is from 0 to 500 or from 0 to 200, or from 0 to 100, or from 0 to 20, where it is understood that when n is other than 0, n is a distribution having a mode equal to a stated value. When n is 2 or more, the SiO units may carry the same or different $R^A$ substituents and if different $R^A$ substituents are present, the n groups may be in random or block configuration.

In Formula A, three $R^A$ may each comprise a polymerizable group, alternatively two $R^A$ may each comprise a polymerizable group, or alternatively one $R^A$ may comprise a polymerizable group.

Examples of silicone-containing components suitable for use in the invention include, but are not limited to, compounds listed in Table B. Where the compounds in Table B contain polysiloxane groups, the number of SiO repeat units in such compounds, unless otherwise indicated, is preferably from 3 to 100, more preferably from 3 to 40, or still more preferably from 3 to 20.

TABLE B

| | |
|---|---|
| 1 | mono-methacryloxypropyl terminated mono-n-butyl terminated polydimethylsiloxanes (mPDMS) (preferably containing from 3 to 15 SiO repeating units) |
| 2 | mono-acryloxypropyl terminated mono-n-butyl terminated polydimethylsiloxane |
| 3 | mono(meth)acryloxypropyl terminated mono-n-methyl terminated polydimethylsiloxane |
| 4 | mono(meth)acryloxypropyl terminated mono-n-butyl terminated polydiethylsiloxane |
| 5 | mono(meth)acryloxypropyl terminated mono-n-methyl terminated polydiethylsiloxane |
| 6 | mono(meth)acrylamidoalkylpolydialkylsiloxanes |
| 7 | mono(meth)acryloxyalkyl terminated mono-alkyl polydiarylsiloxanes |
| 8 | 3-methacryloxypropyltris(trimethylsiloxy)silane (TRIS) |
| 9 | 3-methacryloxypropylbis(trimethylsiloxy)methylsilane |
| 10 | 3-methacryloxypropylpentamethyl disiloxane |
| 11 | mono(meth)acrylamidoalkylpolydialkylsiloxanes |
| 12 | mono(meth)acrylamidoalkyl polydimethylsiloxanes |
| 13 | N-(2,3-dihydroxypropane)-N'-(propyl tetra(dimethylsiloxy) dimethylbutylsilane)acrylamide |
| 14 | N-[3-tris(trimethylsiloxy)silyl]-propyl acrylamide (TRIS-Am) |
| 15 | 2-hydroxy-3-[3-methyl-3,3-di(trimethylsiloxy)silylpropoxy]-propyl methacrylate (SIMAA) |
| 16 | 2-hydroxy-3-methacryloxypropyloxypropyl-tris(trimethylsiloxy)silane |
| 17 | 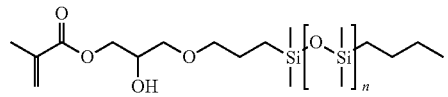<br>mono-(2-hydroxy-3-methacryloxypropyloxy)-propyl terminated mono-n-butyl terminated polydimethylsiloxanes (OH-mPDMS) (containing from 4 to 30, or from 4 to 20, or from 4 to 15 SiO repeat units) |
| 18 | 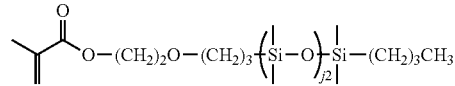 |
| 19 | 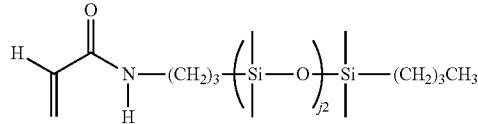 |
| 20 | 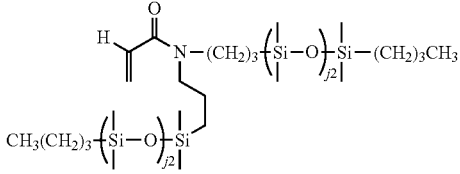 |

TABLE B-continued

21 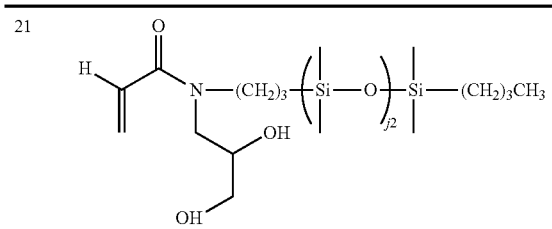

22 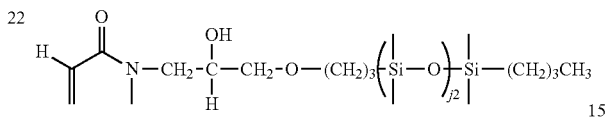

23 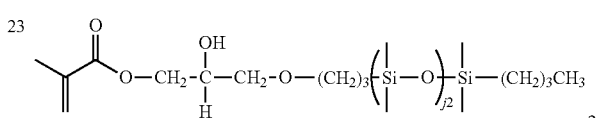

TABLE B-continued

24 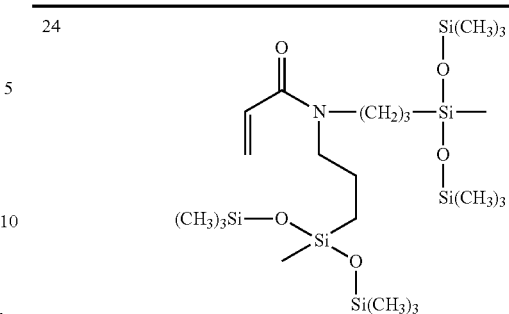

Additional non-limiting examples of suitable silicone-containing components are listed in Table C. Unless otherwise indicated, j2 where applicable is preferably from 1 to 100, more preferably from 3 to 40, or still more preferably from 3 to 15. In compounds containing j1 and j2, the sum of j1 and j2 is preferably from 2 to 100, more preferably from 3 to 40, or still more preferably from 3 to 15.

TABLE C

25 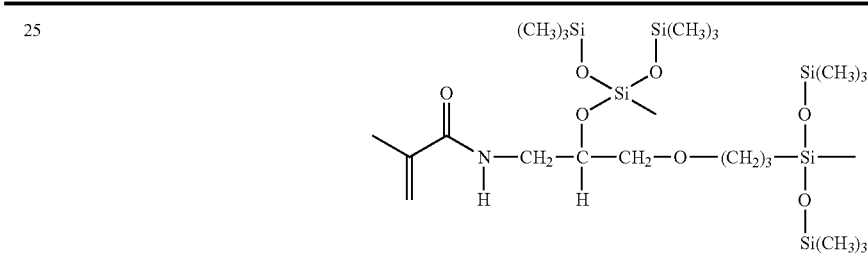

26 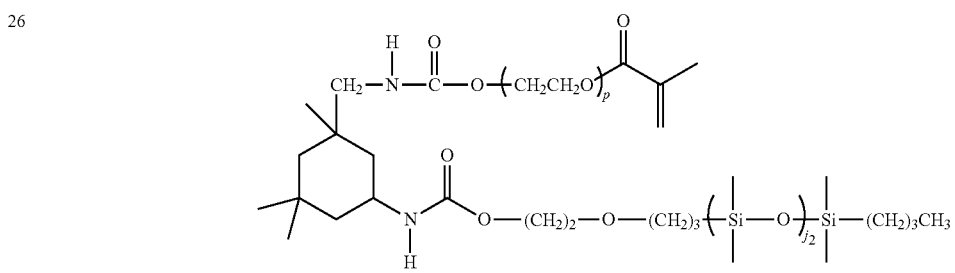

p is 1 to 10

27 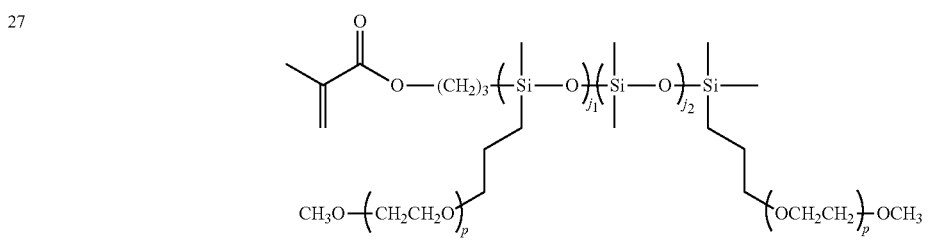

p is 5-10

28 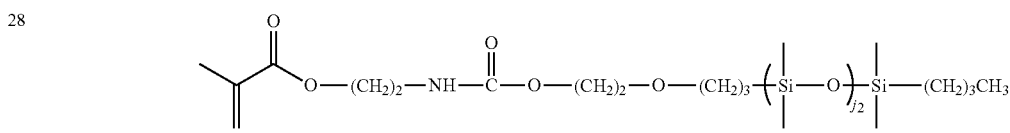

TABLE C-continued

| 29 | 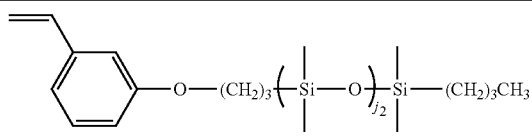 |
|---|---|
| 30 | 1,3-bis[4-(vinyloxycarbonyloxy)but-1-yl]tetramethyl-disiloxane |
| 31 | 3-(vinyloxycarbonylthio)propyl-[tris(trimethylsiloxy)silane] |
| 32 | 3-[tris(trimethylsiloxy)silyl] propyl allyl carbamate |
| 33 | 3-[tris(trimethylsiloxy)silyl] propyl vinyl carbamate |
| 34 | tris(trimethylsiloxy)silylstyrene (Styryl-TRIS) |

35

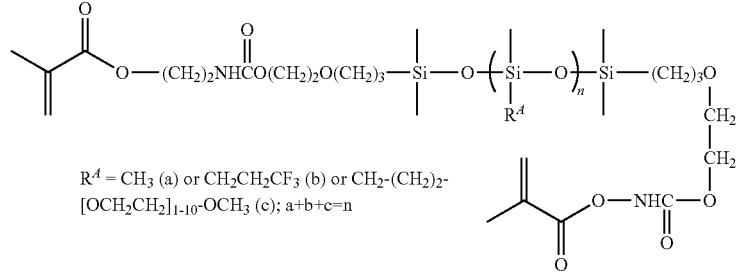

$R^A$ = CH$_3$ (a) or CH$_2$CH$_2$CF$_3$ (b) or CH$_2$-(CH$_2$)$_2$-[OCH$_2$CH$_2$]$_{1-10}$-OCH$_3$ (c); a+b+c=n

36

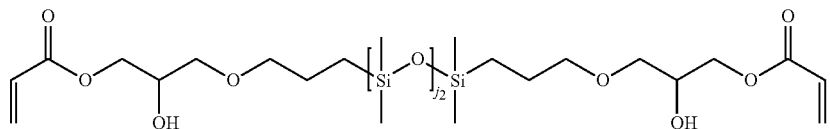

37

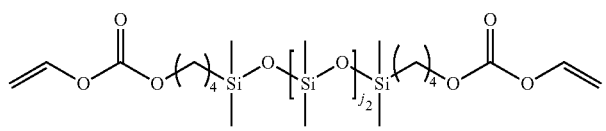

38

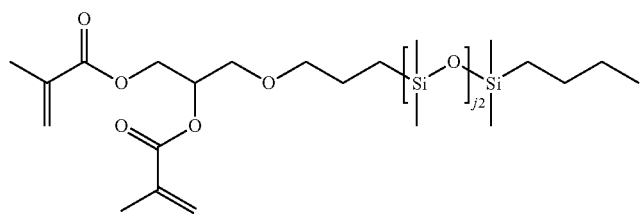

39

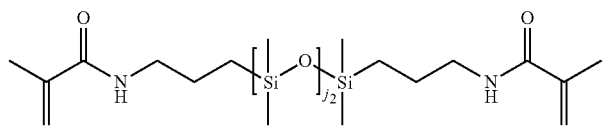

40

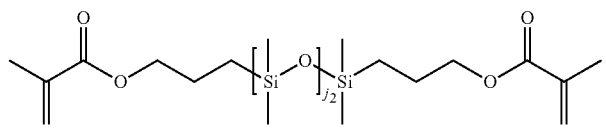

41

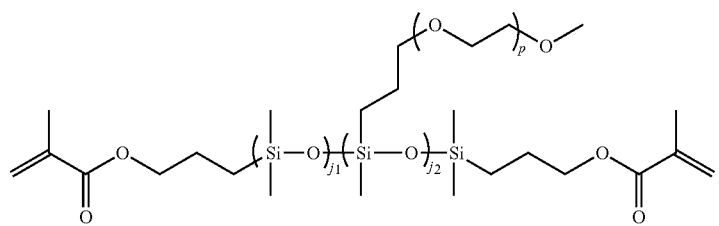

j1 = 80-90
j2 = 5-6
p - 7-8

TABLE C-continued

42

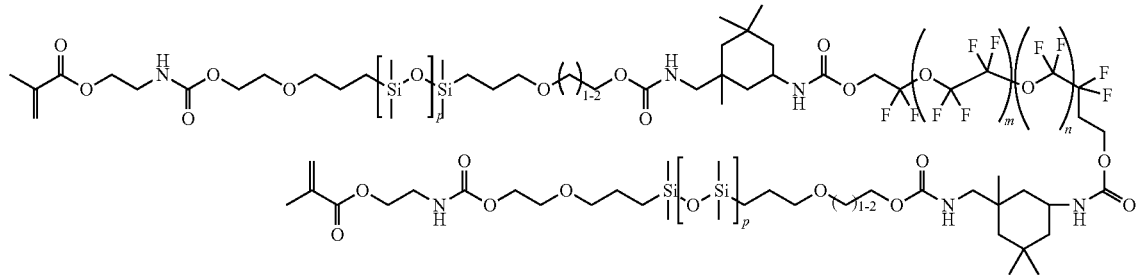

m = 3.5-5.5; n = 4-6.5; p = 22-26

43

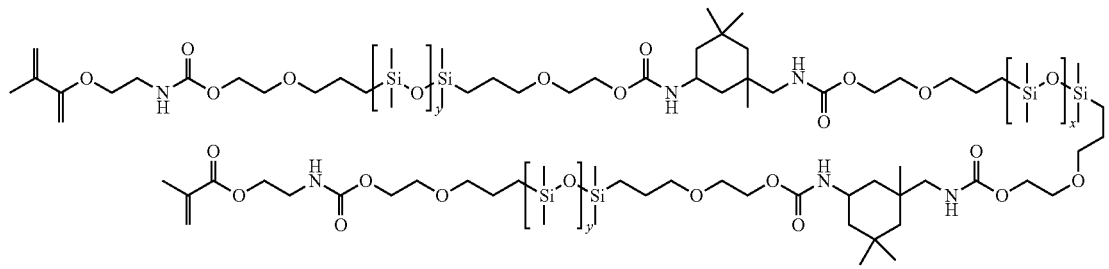

IEM-PDMS(Mn = 3000)-IPDI-PDMS(Mn = 2000)-IPDI-PDMS(Mn = 3000)-IEM (see WO2016100457)

Mixtures of silicone-containing components may be used. By way of example, suitable mixtures may include, but are not limited to: a mixture of mono-(2-hydroxy-3-methacryloxypropyloxy)-propyl terminated mono-n-butyl terminated polydimethylsiloxane (OH-mPDMS) having different molecular weights, such as a mixture of OH-mPDMS containing 4 and 15 SiO repeat units; a mixture of OH-mPDMS with different molecular weights (e.g., containing 4 and 15 repeat SiO repeat units) together with a silicone based crosslinker, such as bis-3-acryloxy-2-hydroxypropyloxypropyl polydimethylsiloxane (ac-PDMS); a mixture of 2-hydroxy-3-[3-methyl-3,3-di(trimethylsiloxy)silylpropoxy]-propyl methacrylate (SiMAA) and mono-methacryloxypropyl terminated mono-n-butyl terminated polydimethylsiloxane (mPDMS), such as mPDMS 1000.

Silicone-containing components for use in the invention may have an average molecular weight of from about 400 to about 4000 daltons.

The silicone containing component(s) may be present in amounts up to about 95 weight %, or from about 10 to about 80 weight %, or from about 20 to about 70 weight %, based upon all reactive components of the reactive mixture (excluding diluents).

Polyamides

The reactive mixture may include at least one polyamide. As used herein, the term "polyamide" refers to polymers and copolymers comprising repeating units containing amide groups. The polyamide may comprise cyclic amide groups, acyclic amide groups and combinations thereof and may be any polyamide known to those of skill in the art. Acyclic polyamides comprise pendant acyclic amide groups and are capable of association with hydroxyl groups. Cyclic polyamides comprise cyclic amide groups and are capable of association with hydroxyl groups.

Examples of suitable acyclic polyamides include polymers and copolymers comprising repeating units of Formulae G1 and G2:

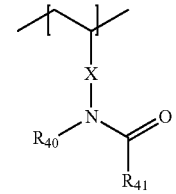

Formula G1

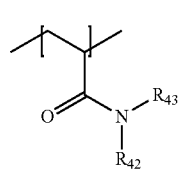

Formula G2 wherein X is a direct bond, —(CO)—, or —(CONHR$_{44}$)—, wherein R$_{44}$ is a C$_1$ to C$_3$ alkyl group; R$_{40}$ is selected from H, straight or branched, substituted or unsubstituted C$_1$ to C$_4$ alkyl groups; R$_{41}$ is selected from H, straight or branched, substituted or unsubstituted C$_1$ to C$_4$ alkyl groups, amino groups having up to two carbon atoms, amide groups having up to four carbon atoms, and alkoxy groups having up to two carbon groups; R$_{42}$ is selected from H, straight or branched, substituted or unsubstituted C$_1$ to C$_4$ alkyl groups; or methyl, ethoxy, hydroxyethyl, and hydroxymethyl; R$_{43}$ is selected from H, straight or branched, substituted or unsubstituted C$_1$ to C$_4$ alkyl groups; or methyl, ethoxy, hydroxyethyl, and hydroxymethyl; wherein the number of carbon atoms in R$_{40}$ and R$_{41}$ taken together is 8 or less, including 7, 6, 5, 4, 3, or less; and wherein the number of carbon atoms in R$_{42}$ and R$_{43}$ taken together is 8 or less, including 7, 6, 5, 4, 3, or less. The number of carbon atoms in R$_{40}$ and R$_{41}$ taken together may be 6 or less or 4 or less. The number of carbon atoms in $R_{42}$ and $R_{43}$ taken together may be 6 or less. As used herein substituted alkyl groups include alkyl groups substituted with an amine, amide, ether, hydroxyl, carbonyl or carboxy groups or combinations thereof.

$R_{40}$ and $R_{41}$ may be independently selected from H, substituted or unsubstituted $C_1$ to $C_2$ alkyl groups. X may be a direct bond, and $R_{40}$ and $R_{41}$ may be independently selected from H, substituted or unsubstituted $C_1$ to $C_2$ alkyl groups. $R_{42}$ and $R_{43}$ can be independently selected from H, substituted or unsubstituted $C_1$ to $C_2$ alkyl groups, methyl, ethoxy, hydroxyethyl, and hydroxymethyl.

The acyclic polyamides of the present invention may comprise a majority of the repeating units of Formula LV or Formula LVI, or the acyclic polyamides can comprise at least 50 mole percent of the repeating unit of Formula G or Formula G1, including at least 70 mole percent, and at least 80 mole percent. Specific examples of repeating units of Formula G and Formula G1 include repeating units derived from N-vinyl-N-methylacetamide, N-vinylacetamide, N-vinyl-N-methylpropionamide, N-vinyl-N-methyl-2-methylpropionamide, N-vinyl-2-methylpropionamide, N-vinyl-N,N'-dimethylurea, N,N-dimethylacrylamide, methacrylamide, and acyclic amides of Formulae G2 and G3:

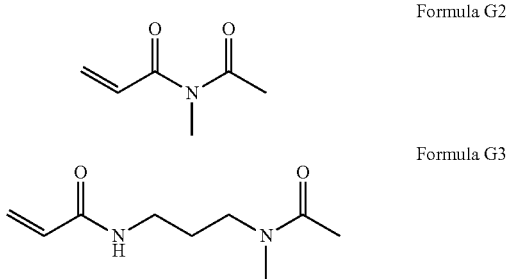

Formula G2

Formula G3

Examples of suitable cyclic amides that can be used to form the cyclic polyamides of include α-lactam, β-lactam, γ-lactam, δ-lactam, and ε-lactam. Examples of suitable cyclic polyamides include polymers and copolymers comprising repeating units of Formula G4:

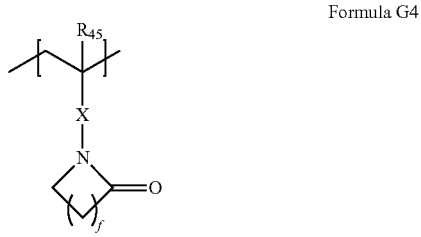

Formula G4 wherein $R_{45}$ is a hydrogen atom or methyl group; wherein f is a number from 1 to 10; wherein X is a direct bond, —(CO)—, or —(CONHR$_{46}$)—, wherein $R_{46}$ is a $C_1$ to $C_3$ alkyl group. In Formula LIX, f may be 8 or less, including 7, 6, 5, 4, 3, 2, or 1. In Formula G4, f may be 6 or less, including 5, 4, 3, 2, or 1. In Formula G4, f may be from 2 to 8, including 2, 3, 4, 5, 6, 7, or 8. In Formula LIX, f may be 2 or 3. When X is a direct bond, f may be 2. In such instances, the cyclic polyamide may be polyvinylpyrrolidone (PVP).

The cyclic polyamides of the present invention may comprise 50 mole percent or more of the repeating unit of Formula G4, or the cyclic polyamides can comprise at least 50 mole percent of the repeating unit of Formula G4, including at least 70 mole percent, and at least 80 mole percent.

The polyamides may also be copolymers comprising repeating units of both cyclic and acyclic amides. Additional repeating units may be formed from monomers selected from hydroxyalkyl(meth)acrylates, alkyl(meth)acrylates, other hydrophilic monomers and siloxane substituted (meth) acrylates. Any of the monomers listed as suitable hydrophilic monomers may be used as co-monomers to form the additional repeating units. Specific examples of additional monomers which may be used to form polyamides include 2-hydroxyethyl (meth)acrylate, vinyl acetate, acrylonitrile, hydroxypropyl (meth)acrylate, methyl (meth)acrylate and hydroxybutyl (meth)acrylate, dihydroxypropyl (meth)acrylate, polyethylene glycol mono(meth)acrylate, and the like and mixtures thereof. Ionic monomers may also be included. Examples of ionic monomers include (meth)acrylic acid, N-[(ethenyloxy)carbonyl]-β-alanine (VINAL, CAS #148969-96-4), 3-acrylamidopropanoic acid (ACA1), 5-acrylamidopentanoic acid (ACA2), 3-acrylamido-3-methylbutanoic acid (AMBA), 2-(methacryloyloxy)ethyl trimethylammonium chloride (Q Salt or METAC), 2-acrylamido-2-methylpropane sulfonic acid (AMPS), 1-propanaminium, N-(2-carboxyethyl)-N,N-dimethyl-3-[(1-oxo-2-propen-1-yl)amino]-, inner salt (CBT, carboxybetaine; CAS 79704-35-1), 1-propanaminium, N,N-dimethyl-N-[3-[(1-oxo-2-propen-1-yl)amino]propyl]-3-sulfo-, inner salt (SBT, sulfobetaine, CAS 80293-60-3), 3,5-Dioxa-8-aza-4-phosphaundec-10-en-i-aminium, 4-hydroxy-N,N,N-trimethyl-9-oxo-, inner salt, 4-oxide (9CI) (PBT, phosphobetaine, CAS 163674-35-9, 2-methacryloyloxyethyl phosphorylcholine, 3-(dimethyl(4-vinylbenzyl)ammonio) propane-1-sulfonate (DMVBAPS), 3-((3-acrylamidopropyl) dimethylammonio)propane-1-sulfonate (AMPDAPS), 3-((3-methacrylamidopropyl)dimethylammonio)propane-1-sulfonate (MAMPDAPS), 3-((3-(acryloyloxy)propyl)dimethylammonio)propane-1-sulfonate (APDAPS), methacryloyloxy)propyl)dimethylammonio)propane-1-sulfonate (MAPDAPS).

The reactive monomer mixture may comprise both an acyclic polyamide and a cyclic polyamide or copolymers thereof. The acyclic polyamide can be any of those acyclic polyamides described herein or copolymers thereof, and the cyclic polyamide can be any of those cyclic polyamides described herein or copolymers thereof. The polyamide may be selected from the group polyvinylpyrrolidone (PVP), polyvinylmethyacetamide (PVMA), polydimethylacrylamide (PDMA), polyvinylacetamide (PNVA), poly(hydroxyethyl(meth)acrylamide), polyacrylamide, and copolymers and mixtures thereof. The polyamide may be a mixture of PVP (e.g., PVP K90) and PVMA (e.g., having a Mw of about 570 KDa).

The total amount of all polyamides in the reactive mixture may be in the range of between 1 weight percent and about 35 weight percent, including in the range of about 1 weight percent to about 15 weight percent, and in the range of about 5 weight percent to about 15 weight percent, in all cases, based on the total weight of the reactive components of the reactive monomer mixture.

Without intending to be bound by theory, when used with a silicone hydrogel, the polyamide functions as an internal wetting agent. The polyamides of the present invention may be non-polymerizable, and in this case, are incorporated into the silicone hydrogels as semi-interpenetrating networks. The polyamides are entrapped or physically retained within the silicone hydrogels. Alternatively, the polyamides of the present invention may be polymerizable, for example as polyamide macromers or prepolymers, and in this case, are covalently incorporated into the silicone hydrogels. Mixtures of polymerizable and non-polymerizable polyamides may also be used.

When the polyamides are incorporated into the reactive monomer mixture they may have a weight average molecular weight of at least 100,000 daltons; greater than about 150,000; between about 150,000 to about 2,000,000 daltons; between about 300,000 to about 1,800,000 daltons. Higher molecular weight polyamides may be used if they are compatible with the reactive monomer mixture.

Cross-Linking Agents

It is generally desirable to add one or more cross-linking agents, also referred to as cross-linking monomers, multifunctional macromers, and prepolymers, to the reactive mixture. The cross-linking agents may be selected from bifunctional crosslinkers, trifunctional crosslinkers, tetrafunctional crosslinkers, and mixtures thereof, including silicone-containing and non-silicone containing cross-linking agents. Non-silicone-containing cross-linking agents include ethylene glycol dimethacrylate (EGDMA), tetraethylene glycol dimethacrylate (TEGDMA), trimethylolpropane trimethacrylate (TMPTMA), triallyl cyanurate (TAC), glycerol trimethacrylate, methacryloxyethyl vinylcarbonate (HEMAVc), allylmethacrylate, methylene bisacrylamide (MBA), and polyethylene glycol dimethacrylate wherein the polyethylene glycol has a molecular weight up to about 5000 Daltons. The cross-linking agents are used in the usual amounts, e.g., from about 0.000415 to about 0.0156 mole per 100 grams of reactive Formulas in the reactive mixture. Alternatively, if the hydrophilic monomers and/or the silicone-containing components are multifunctional by molecular design or because of impurities, the addition of a cross-linking agent to the reactive mixture is optional. Examples of hydrophilic monomers and macromers which can act as the cross-linking agents and when present do not require the addition of an additional cross-linking agent to the reactive mixture include (meth)acrylate and (meth)acrylamide end-capped polyethers. Other cross-linking agents will be known to one skilled in the art and may be used to make the silicone hydrogel of the present invention.

It may be desirable to select crosslinking agents with similar reactivity to one or more of the other reactive components in the formulation. In some cases, it may be desirable to select a mixture of crosslinking agents with different reactivity in order to control some physical, mechanical or biological property of the resulting silicone hydrogel. The structure and morphology of the silicone hydrogel may also be influenced by the diluent(s) and cure conditions used.

Multifunctional silicone-containing components, including macromers, cross-linking agents, and prepolymers, may also be included to further increase the modulus and retain tensile strength. The silicone containing cross-linking agents may be used alone or in combination with other cross-linking agents. An example of a silicone containing component which can act as a cross-linking agent and, when present, does not require the addition of a crosslinking monomer to the reactive mixture includes α, ω-bismethacryloxypropyl polydimethylsiloxane. Another example is bis-3-acryloxy-2-hydroxypropyloxypropyl polydimethylsiloxane (ac-PDMS).

Cross-linking agents that have rigid chemical structures and polymerizable groups that undergo free radical polymerization may also be used. Non-limiting examples of suitable rigid structures include cross-linking agents comprising phenyl and benzyl ring, such are 1,4-phenylene diacrylate, 1,4-phenylene dimethacrylate, 2,2-bis(4-methacryloxyphenyl)-propane, 2,2-bis[4-(2-acryloxyethoxy)phenyl]propane, 2,2-bis[4-(2-hydroxy-3-methacryloxypropoxy)-phenyl]propane, and 4-vinylbenzyl methacrylate, and combinations thereof. Rigid crosslinking agents may be included in amounts between about 0.5 and about 15, or 2-10, 3-7 based upon the total weight of all of the reactive components. The physical and mechanical properties of the silicone hydrogels of the present invention may be optimized for a particular use by adjusting the components in the reactive mixture.

Non-limiting examples of silicone cross-linking agents also include the multi-functional silicone-containing components described in Table D above.

Further Constituents

The reactive mixture may contain additional components such as, but not limited to, diluents, initiators, UV absorbers, visible light absorbers, photochromic compounds, pharmaceuticals, nutraceuticals, antimicrobial substances, tints, pigments, copolymerizable dyes, nonpolymerizable dyes, release agents, and combinations thereof.

Classes of suitable diluents for silicone hydrogel reactive mixtures include alcohols having 2 to 20 carbon atoms, amides having 10 to 20 carbon atoms derived from primary amines and carboxylic acids having 8 to 20 carbon atoms. The diluents may be primary, secondary, and tertiary alcohols.

Generally, the reactive components are mixed in a diluent to form a reactive mixture. Suitable diluents are known in the art. For silicone hydrogels, suitable diluents are disclosed in WO 03/022321 and U.S. Pat. No. 6,020,445, the disclosure of which is incorporated herein by reference. Classes of suitable diluents for silicone hydrogel reactive mixtures include alcohols having 2 to 20 carbons, amides having 10 to 20 carbon atoms derived from primary amines, and carboxylic acids having 8 to 20 carbon atoms. Primary and tertiary alcohols may be used. Preferred classes include alcohols having 5 to 20 carbons and carboxylic acids having 10 to 20 carbon atoms. Specific diluents which may be used include 1-ethoxy-2-propanol, diisopropylaminoethanol, isopropanol, 3,7-dimethyl-3-octanol, 1-decanol, 1-dodecanol, 1-octanol, 1-pentanol, 2-pentanol, 1-hexanol, 2-hexanol, 2-octanol, 3-methyl-3-pentanol, tert-amyl alcohol, tert-butanol, 2-butanol, 1-butanol, 2-methyl-2-pentanol, 2-propanol, 1-propanol, ethanol, 2-ethyl-1-butanol, (3-acetoxy-2-hydroxypropyloxy)-propylbis(trimethylsiloxy) methylsilane, 1-tert-butoxy-2-propanol, 3,3-dimethyl-2-butanol, tert-butoxyethanol, 2-octyl-1-dodecanol, decanoic acid, octanoic acid, dodecanoic acid, 2-(diisopropylamino) ethanol mixtures thereof and the like. Examples of amide diluents include N,N-dimethyl propionamide and dimethyl acetamide.

Preferred diluents include 3,7-dimethyl-3-octanol, 1-dodecanol, 1-decanol, 1-octanol, 1-pentanol, 1-hexanol, 2-hexanol, 2-octanol, 3-methyl-3-pentanol, 2-pentanol, t-amyl alcohol, tert-butanol, 2-butanol, 1-butanol, 2-methyl-2-pentanol, 2-ethyl-1-butanol, ethanol, 3,3-dimethyl-2-butanol, 2-octyl-1-dodecanol, decanoic acid, octanoic acid, dodecanoic acid, mixtures thereof and the like.

More preferred diluents include 3,7-dimethyl-3-octanol, 1-dodecanol, 1-decanol, 1-octanol, 1-pentanol, 1-hexanol, 2-hexanol, 2-octanol, 1-dodecanol, 3-methyl-3-pentanol, 1-pentanol, 2-pentanol, t-amyl alcohol, tert-butanol, 2-butanol, 1-butanol, 2-methyl-2-pentanol, 2-ethyl-1-butanol, 3,3-dimethyl-2-butanol, 2-octyl-1-dodecanol, mixtures thereof and the like. If a diluent is present, generally there are no particular restrictions with respect to the amount of diluent present. When diluent is used, the diluent may be present in an amount in the range of about 2 to about 70 weight percent, including in the range of about 5 to about 50 weight percent, and in the range of about 15 to about 40 weight percent, based on the total weight of the reactive mixtures (including reactive and nonreactive Formulas). Mixtures of diluents may be used.

A polymerization initiator may be used in the reactive mixture. The polymerization initiator may include, for instance, at least one of lauroyl peroxide, benzoyl peroxide, iso-propyl percarbonate, azobisisobutyronitrile, and the like, that generate free radicals at moderately elevated temperatures, and photoinitiator systems such as aromatic alpha-hydroxy ketones, alkoxyoxybenzoins, acetophenones, acylphosphine oxides, bisacylphosphine oxides, and a tertiary amine plus a diketone, mixtures thereof and the like. Illustrative examples of photoinitiators are 1-hydroxycyclo-hexyl phenyl ketone, 2-hydroxy-2-methyl-1-phenyl-propan-1-one, bis(2,6-dimethoxybenzoyl)-2,4-4-trimethylpentyl phosphine oxide (DMBAPO), bis(2,4,6-trimethylbenzoyl)-phenyl phosphine oxide (Irgacure 819), 2,4,6-trimethylben-zyldiphenyl phosphine oxide and 2,4,6-trimethylbenzoyl diphenylphosphine oxide, benzoin methyl ester and a combination of cam-phorquinone and ethyl 4-(N,N-dimethyl-amino)benzoate.

Commercially available (from IGM Resins B.V., The Netherlands) visible light initiator systems include Irgacure® 819, Irgacure® 1700, Irgacure® 1800, Irgacure® 819, Irgacure® 1850 and Lucrin® TPO initiator. Commercially available (from IGM Resins B.V.) UV photoinitiators include Darocur® 1173 and Darocur® 2959. These and other photoinitiators which may be used are disclosed in Volume III, Photoinitiators for Free Radical Cationic & Anionic Photopolymerization, 2nd Edition by J. V. Crivello & K. Dietliker; edited by G. Bradley; John Wiley and Sons; New York; 1998. The initiator is used in the reactive mixture in effective amounts to initiate photopolymerization of the reactive mixture, e.g., from about 0.1 to about 2 parts by weight per 100 parts of reactive monomer mixture. Polymerization of the reactive mixture can be initiated using the appropriate choice of heat or visible or ultraviolet light or other means depending on the polymerization initiator used. Alternatively, initiation can be conducted using e-beam without a photoinitiator. However, when a photoinitiator is used, the preferred initiators are bisacylphosphine oxides, such as bis(2,4,6-tri-methylbenzoyl)-phenyl phosphine oxide (Irgacure® 819) or a combination of 1-hydroxycyclo-hexyl phenyl ketone and bis(2,6-dimethoxybenzoyl)-2,4-4-trimethylpentyl phosphine oxide (DMBAPO).

Curing and Manufacture of Contact Lens Precursor

The reactive mixtures may be formed by any of the methods known in the art, such as shaking or stirring, and used to form polymeric networks or devices by known methods. The reactive components are mixed together either with or without a diluent to form the reactive mixture.

For example, ophthalmic devices may be prepared by mixing reactive components, and, optionally, diluent(s), with a polymerization initiator and curing by appropriate conditions to form a product that can be subsequently formed into the appropriate shape by lathing, cutting, and the like. Alternatively, the reactive mixture may be placed in a mold and subsequently cured into the appropriate article.

A method of making a molded ophthalmic device, such as a silicone hydrogel contact lens precursor for use in the invention, may comprise: preparing a reactive monomer mixture; transferring the reactive monomer mixture onto a first mold; placing a second mold on top the first mold filled with the reactive monomer mixture; and curing the reactive monomer mixture by free radical copolymerization to form the silicone hydrogel in the shape of a contact lens precursor.

The reactive mixture may be cured via any known process for molding the reactive mixture in the production of contact lenses, including spincasting and static casting. Spincasting methods are disclosed in U.S. Pat. Nos. 3,408,429 and 3,660,545, and static casting methods are disclosed in U.S. Pat. Nos. 4,113,224 and 4,197,266. The contact lens precursors of this invention may be formed by the direct molding of the silicone hydrogels, which is economical, and enables precise control over the final shape of the lens precursor. For this method, the reactive mixture is placed in a mold having the shape of the final desired silicone hydrogel and the reactive mixture is subjected to conditions whereby the monomers polymerize, thereby producing a polymer in the approximate shape of the final desired product.

Localization of Visible-Light Absorbing Chromophore

In the invention, the visible-light absorbing chromophore, introduced into the lens precursor via the chromophore-containing monomer, is concentrated in desired regions of the lens. Localized concentration of the visible light absorbing chromophore is achieved by selectively derivatizing the chromophore in regions where its light absorbing properties are not needed or not desired. Selective derivatization is preferably achieved chemically. More preferably, derivatization is via chemical oxidation of one or more functional groups in the visible light absorbing chromophore that, as a consequence of the oxidation, results in a material that has greater visible light transmittance, for instance across 400 to 460 nm, than the parent chromophore.

Where the derivatization is by chemical oxidation, the visible light absorbing chromophore preferably contains a functional group that can readily undergo the oxidation reaction under conditions that result in a material with greater light transmission than the parent. Exemplary functional groups for such oxidation include S, NR, and Se. Preferred visible light absorbing chromophores therefore include materials as described above that contain an oxidizable functional group, for instance an oxidizable sulfur, selenium, or amine moiety.

Chemical oxidation may, for instance, be carried out by bleaching, for instance as described in the Examples below. Various reagents may be used for oxidation including, without limitation, hypochlorite, Oxone®, dimethyldioxi-rane, hydrogen peroxide, and/or chlorite.

In order to form the derivative of the visible light absorbing chromophore in select regions of the lens precursor, such as in the second region, the first region of the lens precursor, where derivatization is not desired, is masked from the derivatization conditions. For instance, if derivatization is by chemical means, such as by chemical oxidation, the first region of the lens precursor may be masked from the derivatization reagents using, for example, a cup that is appropriately sized to exclude the derivatization reagents from the first region. Preferably, such cup is formed of a material, such as silicone, that provides adequate masking of the first region, but without damaging the underlying lens precursor. Other masking techniques or equipment may readily be used.

Once the first region of the lens precursor is appropriately masked, the derivatization step is then carried out. For instance, if derivatization is by chemical means, the derivatization reagent can be applied such that it contacts the second region without significantly contacting the first region. The contacting of the reagent with the second region may be continued until the desired level of derivatization has been accomplished, and then the reagent removed, for instance by washing. An exemplary methodology is described in the Examples. The resulting contact lens will consequently comprise the visible light absorbing chromophore in the first region of the lens, and the derivative of the chromophore in the second region of the lens. The method thus provides a contact lens in which the visible light absorbing chromophore is concentrated in desired regions of the lens, for instance in the central zone, and the less absorbing derivative, which may be less visually noticeable to an observer, is concentrated in the peripheral zone of the lens.

Derivatization as described above is preferably conducted while the contact lens precursor is still within the mold (preferably one of the mold halves is removed, thus allowing access to the lens precursor in the other mold half). After derivatization, the resultant contact lens may be subjected to processing methodologies typically used in the production of contact lenses including, extraction to remove unreacted components and release the lens from the lens mold. The extraction may be done using conventional extraction fluids, including organic solvents, such as alcohols, or may be extracted using aqueous solutions.

Aqueous solutions are solutions which comprise water. The aqueous solutions of the present invention may comprise at least about 20 weight percent water, or at least about 50 weight percent water, or at least about 70 weight percent water, or at least about 95 weight percent water. Aqueous solutions may also include additional water soluble Formulas such as inorganic salts or release agents, wetting agents, slip agents, pharmaceutical and nutraceutical Formulas, combinations thereof and the like. Release agents are compounds or mixtures of compounds which, when combined with water, decrease the time required to release a contact lens from a mold, as compared to the time required to release such a lens using an aqueous solution that does not comprise the release agent. The aqueous solutions may not require special handling, such as purification, recycling or special disposal procedures.

Extraction may be accomplished, for example, via immersion of the lens in an aqueous solution or exposing the lens to a flow of an aqueous solution. Extraction may also include, for example, one or more of: heating the aqueous solution; stirring the aqueous solution; increasing the level of release aid in the aqueous solution to a level sufficient to cause release of the lens; mechanical or ultrasonic agitation of the lens; and incorporating at least one leaching or extraction aid in the aqueous solution to a level sufficient to facilitate adequate removal of unreacted components from the lens. The foregoing may be conducted in batch or continuous processes, with or without the addition of heat, agitation or both.

Application of physical agitation may be desired to facilitate leach and release. For example, the lens mold part to which a lens is adhered can be vibrated or caused to move back and forth within an aqueous solution. Other methods may include ultrasonic waves through the aqueous solution.

The lenses may be sterilized by known means such as, but not limited to, autoclaving.

As indicated above, preferred contact lenses are soft hydrogel contact lenses. The transmission wavelengths and percentages described herein may be measured on various thicknesses of lenses using, for instance, the methodologies described in the Examples. By way of example, a preferred center thickness for measuring transmission spectra of a first region where the first region corresponds to the central region of a soft contact lens may be from 80 to 100 microns, or from 90 to 100 microns or from 90 to 95 microns. Typically in such case, the measurement may be made at the center of the lens using, for instance, a 4 nm instrument slit width. Or, the measurement may be made in the second region, such as the peripheral zone, again using a 4 nm slit width. It should be understood that for purposes of the invention the difference in transmission between the first region and the second region of the lens may be apparent to an observer without the need for collecting a transmission spectrum. For instance, if the second region has less observed coloring than the first region, then this may indicate that the second region has a greater average percent transmission than the first region in the visible spectrum, for instance in the 380 nm to 760 nm range, or in the 400 nm to 600 nm range.

When the contact lens of the invention is a silicone hydrogel contact lens, the lens may preferably exhibit the following properties. All values are prefaced by "about," and the lens may have any combination of the listed properties. The properties may be determined by methods known to those skilled in the art, for instance as described in United States pre-grant publication US20180037690, which is incorporated herein by reference.

Water concentration %: at least 20%, or at least 25% and up to 80% or up to 70%

Haze: 30% or less, or 10% or less

Advancing dynamic contact angle (Wilhelmy plate method): 1000 or less, or 800 or less; or 500 or less Tensile Modulus (psi): 120 or less, or 80 to 120

Oxygen permeability (Dk, barrers): at least 80, or at least 100, or at least 150, or at least 200

Elongation to Break: at least 100 For ionic silicon hydrogels, the following properties may also be preferred (in addition to those recited above):

Lysozyme uptake (μg/lens): at least 100, or at least 150, or at least 500, or at least 700

Polyquaternium 1 (PQ1) uptake (%): 15 or less, or 10 or less, or 5 or less

Compounds of the invention may be used with other products, in addition to ophthalmic devices. For instance, the compounds may be used in windows (e.g., vehicle or building windows), or optical equipment, such as binoculars and cameras, and the like. In such use, the compounds may, for instance, be coated on the surface of the device. To facilitate coating, the compound may be dissolved in a solvent.

Some embodiments of the invention will now be described in detail in the following Examples.

EXAMPLES

Test Methods

Water content (WC) was measured gravimetrically. Lenses were equilibrated in packing solution for 24 hours. Each of three test lenses are removed from packing solution using a sponge tipped swab and placed on blotting wipes which have been dampened with packing solution. Both sides of the lens are contacted with the wipe. Using tweezers, the test lenses are placed in a tared weighing pan and weighed. The two more sets of samples are prepared and weighed. All weight measurements were done in triplicate, and the average of those values used in the calculations. The wet weight is defined as the combined weight of the pan and wet lenses minus the weight of the weighing pan alone.

The dry weight was measured by placing the sample pans in a vacuum oven which has been preheated to 60° C. for 30 minutes. Vacuum was applied until the pressure reaches at least 1 inch of Hg is attained; lower pressures are allowed. The vacuum valve and pump are turned off and the lenses are dried for at least 12 hours, typically overnight. The purge valve is opened allowing dry air or dry nitrogen gas to enter. The oven is allowed reach atmospheric pressure. The pans are removed and weighed. The dry weight is defined as the combined weight of the pan and dry lenses minus the weight of the weighing pan alone. The water content of the test lens was calculated as follows: % water content=(wet weight−dry weight)/wet weight×100. The average and standard deviation of the water content were calculated and the average value reported as the percent water content of the test lens.

Wettability of lenses was determined using a sessile drop technique using KRUSS DSA-100 TM instrument at room temperature and using deionized water as probe solution (Sessile Drop). The lenses to be tested were rinsed in deionized water to remove carry over from packing solution. Each test lens was placed on blotting lint free wipes which were dampened with packing solution. Both sides of the lens were contacted with the wipe to remove surface water without drying the lens. To ensure proper flattening, lenses were placed "bowl side down" on the convex surface of contact lens plastic molds. The plastic mold and the lens were placed in the sessile drop instrument holder, ensuring proper central syringe alignment. A 3 to 4 microliter drop of deionized water was formed on the syringe tip using DSA 100-Drop Shape Analysis software ensuring the liquid drop was hanging away from the lens. The drop was released smoothly on the lens surface by moving the needle down. The needle was withdrawn away immediately after dispensing the drop. The liquid drop was allowed to equilibrate on the lens for 5 to 10 seconds, and the contact angle was measured between the drop image and the lens surface. Typically, three to five lenses were evaluated and the average contact angle reported.

The mechanical properties of the contact lenses were measured by using a tensile testing machine such as an Instron model 1122 or 5542 equipped with a load cell and pneumatic grip controls. Minus one diopter lens is the preferred lens geometry because of its central uniform thickness profile. A dog-bone shaped sample cut from a minus one diopter lens having a 0.522 inch length, 0.276 inch "ear" width and 0.213 inch "neck" width was loaded into the grips and elongated at a constant rate of strain of 2 inches per minute until it breaks. The center thickness of the dog-bone sample was measured using an electronic thickness gauge prior to testing. The initial gauge length of the sample ($L_o$) and sample length at break ($L_f$) were measured. At least five specimens of each composition were measured, and the average values were used to calculate the percent elongation to break: percent elongation=$[(L_f-L_o)/L_o]\times 100$. The tensile modulus (M) was calculated as the slope of the initial linear portion of the stress-strain curve; the units of modulus are pounds per square inch or psi. The tensile strength (TS) was calculated from the peak load and the original cross-sectional area: tensile strength=peak load divided by the original cross-sectional area; the units of tensile strength are psi. Toughness was calculated from the energy to break and the original volume of the sample: toughness=energy to break divided by the original sample volume; the units of toughness are in-lbs/in$^3$. The elongation to break (ETB) was also recorded as the percent strain at break.

Ultraviolet-visible spectra of compounds in solution were measured on a Perkin Elmer Lambda 45 or an Agilent Cary 6000i UV-VIS scanning spectrometer. The instrument was thermally equilibrated for at least thirty minutes prior to use. For the Perkin Elmer instrument, the scan range was 200-800 nm; the scan speed was 960 nm per minute; the slit width was 4 nm; the mode was set on transmission or absorbance; and baseline correction was selected. For the Cary instrument, the scan range was 200-800 nm; the scan speed was 600 nm/min; the slit width was 2 nm; the mode was transmission or absorbance; and baseline correction was selected. A baseline correction was performed before samples were analyzed using the autozero function.

Ultraviolet-visible spectra of contact lenses formed in part from the claimed compositions were measured on a Perkin Elmer Lambda 45 UV-VIS or an Agilent Cary 6000i UV-VIS scanning spectrometer using packing solution. The instrument was thermally equilibrated for at least thirty minutes prior to use. For the Perkin Elmer instrument, the scan range was 200-800 nm; the scan speed was 960 nm per minute; the slit width was 4 nm; the mode was set on transmission; and baseline correction was selected. Baseline correction was performed using cuvettes containing plastic two-piece lens holders and the same solvents. These two-piece contact lens holders were designed to hold the sample in the quartz cuvette in the location through which the incident light beam traverses. The reference cuvette also contained a two-piece holder. To ensure that the thickness of the samples is constant, all lenses were made using identical molds. The center thickness of the contact lens was measured using an electronic thickness gauge. Reported center thickness and percent transmission spectra are obtained by averaging three individual lens data.

It is important to ensure that the outside surfaces of the cuvette are completely clean and dry and that no air bubbles are present in the cuvette. Repeatability of the measurement is improved when the reference cuvette and its lens holder remain constant and when all samples use the same sample cuvette and its lens holder, making sure that both cuvettes are properly inserted into the instrument.

A calibrated dual interferometric method was used for measuring contact lens parameters in packing solution. These parameters included equivalent sphere power at multiple apertures (diopters or D), cylinder power at multiple apertures (diopters or D), diameter (millimeters or mm), center thickness (millimeters or mm), sagittal height (millimeters or mm), and root mean squared (RMS) optical path wavefront deviation from lens design target in micrometers or microns (μm) with sphere/cylinder power and coma removed as measured using a 6.5 millimeter aperture. The instrument consists of a custom, propitiatory interferometer for the measurement of wavefront parameters and a Lumetrics OptiGauge® II low-coherence interferometer for the measurement of the dimensional parameters of sagittal height and center thickness. The two individual instruments combined are similar to Lumetrics Clearwave™ Plus, and the software is similar to Lumetrics OptiGauge Control Center v7.0 or higher. With the Clearwave™ Plus, a camera is used to find the lens edge, and then the lens center is calculated, which is then used to align a 1310 nanometer interferometer probe at the lens center for the measurement of sagittal height and center thickness. The transmitted wavefront is also collected in series using a wavefront sensor (Shack-Hartmann sensor). Multiple parameters from the transmitted wavefront of the contact lens are measured, and others are calculated from those measurements. From the data collected, difference terms are calculated by comparing the measured values from the target. These include root mean squared optical path wavefront deviation from lens design target in μm (sphere/cylinder power and coma deviation removed) as measured using a 6.5 millimeter aperture (RMS_65), the second equivalent sphere power deviation from lens design target in diopters (D) as measured using a 5 millimeter aperture (PW2EQD), deviation from lens design target diameter in mm (DMD), deviation from lens design target base curve radius as calculated from the measured sagittal height and target lens diameter according to ISO 18369-3 in mm (BCD), and deviation from lens design target center thickness in mm (CTD).

The following abbreviations will be used throughout the Examples and have the following meanings:

DMA: N, N-dimethylacrylamide (Jarchem)
HEMA: 2-hydroxyethyl methacrylate (Bimax)
PVP K90: poly(N-vinylpyrrolidone) (ISP Ashland)
EGDMA: ethylene glycol dimethacrylate (Esstech)
TEGDMA: tetraethylene glycol dimethacrylate (Esstech)
SiMAA: 2-propenoic acid, 2-methyl-2-hydroxy-3-[3-[1,3,3,3-tetramethyl-1-[(trimethylsilyl)oxy]disiloxanyl]propoxy]propyl ester (Toray) or 3-(3-(1,1,1,3,5,5,5-heptamethyltrisiloxan-3-yl)propoxy)-2-hydroxypropyl methacrylate
mPDMS: mono-n-butyl terminated monomethacryloxypropyl terminated polydimethylsiloxane ($M_n$=800-1500 grams/mole) (Gelest)
Tegomer MA: bis-3-methacryloxy-2-hydroxypropyloxypropyl polydimethylsiloxane ($M_n$=2000

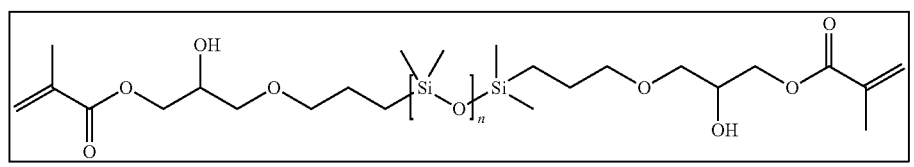

HO-mPDMS: mono-n-butyl terminated mono-(2-hydroxy-3-methacryloxypropyloxy)-propyl terminated polydimethylsiloxane ($M_n$=400 to 1400 grams/mole) (Ortec or DSM-Polymer Technology Group)

OH-mPDMS (n=4):

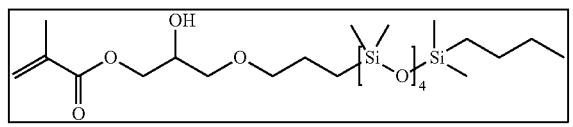

OH-mPDMS (n=15):

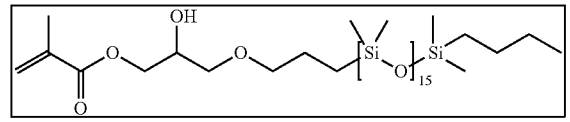

Omnirad 403: bis(2,6-dimethoxybenxoyl)-2,4,4-trimethylpentylphosphine oxide (IGM Resins)
Omnirad 819: bis(2,4,6-trimethylbenzoyl)-phenylphosphineoxide (IGM Resins)
Omnirad 1173: 2-hydroxy-2-methyl-1-phenylpropanone (IGM Resins)
Omnirad 1700: mixture of 25 weight % Omnirad 403 and 75 weight % Omnirad 1173 (IGM Resins)
Omnirad 1870: mixture of 70 weight % Omnirad 403 and 30 weight % Omnirad 1173 (IGM Resins)
Norbloc: 2-(2'-hydroxy-5-methacrylyloxyethylphenyl)-2H-benzotriazole (Janssen)
RB247: 1,4-Bis[2-methacryloxyethylamino]-9,10-anthraquinone (CAS #109561-07-1)
Dye1: 2-((9-(dicyanomethylene)-9H-thioxanthen-2-yl)oxy)ethyl methacrylate

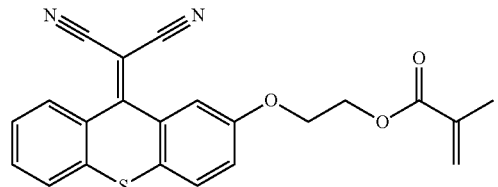

Dye2: 2-(2-(10-butyl-2-methoxyacridin-9(1OH)-ylidene)-2-cyanoacetamido)ethyl methacrylate

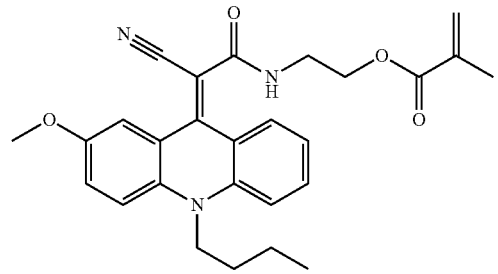 [SMILES: C=C(C)C(=O)OCCNC(=O)/C(C#N)=C1\c2ccccc2N(CCCC)c2ccc(OC)cc21]

Dye3: 2-(2-cyano-2-(9H-thioxanthen-9-ylidene)acetamido)ethyl methacrylate

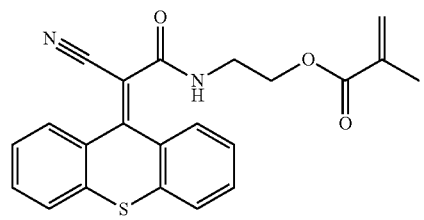 [SMILES: C=C(C)C(=O)OCCNC(=O)C(C#N)=C1c2ccccc2Sc2ccccc21]

Dye 4: N-(2-(2-cyano-2-(10-methylacridin-9(1OH)-ylidene)acetamido)ethyl)methacrylamide

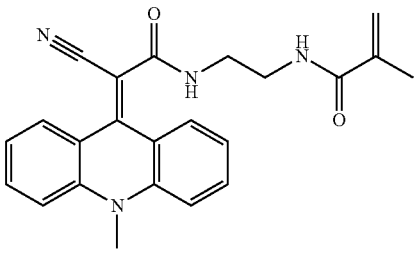 [SMILES: C=C(C)C(=O)NCCNC(=O)C(C#N)=C1c2ccccc2N(C)c2ccccc21]

3E3P: 3-ethyl 3-pentanol
D3O: 3,7-dimethyl-3-octanol (Vigon)
DIW: deionized water
IPA: isopropyl alcohol
PG: 1,2-propylene glycol
HCl: hydrochloric acid
NaOCl: sodium hypochlorite
M: molar (moles/liter)
N: normal (equivalents/liter)
PS: Borate Buffered Packing Solution: 18.52 grams (300 mmol) of boric acid, 3.7 grams (9.7 mmol) of sodium borate decahydrate, and 28 grams (197 mmol) of sodium sulfate were dissolved in enough deionized water to fill a 2-liter volumetric flask.
BC: base curve plastic mold made of PP, TT, Z, or blends thereof
FC: front curve plastic mold made of PP, TT, Z, or blends thereof
PP: polypropylene which is the homopolymer of propylene
TT: Tuftec which is a hydrogenated styrene butadiene block copolymer (Asahi Kasei Chemicals)
Z: Zeonor which is a polycycloolefin thermoplastic polymer (Nippon Zeon Co Ltd)
RMM: reactive monomer mixture
LED: light emitting diode
UV-VIS: ultraviolet-visible
g: gram(s)
mg: milligram(s)
kg: kilogram(s)
L: liter(s)
mL: milliliter(s)
µL: microliter(s)
m: meter(s)
cm: centimeter(s)
mm: millimeter(s)
µm: micrometer(s) or micron(s)
nm: nanometer(s)
in: inch(es)
lb(s): pound(s)
s or sec: second(s)
min: minute(s)
hr: hour(s)
W: watt(s)
mW: milliwatt(s)
D: diopter(s)
Wt. %: weight percent(s)
Contact Lens Precursors (Dyed)
Precursor 1 Lenses: A reactive monomer mixture was formed by mixing the reactive components listed in Table 1 with 3M3P such that the weight ratio of the reactive components to 3M3P was 77:23 (w/w). In this case, formulation components except for the PVP K90 and 3M3P were combined in a solution of dichloromethane, then after removing the dichloromethane under reduced pressure in a rotary evaporator, the required amounts of PVP K90 and 3M3P were added to form the final reactive monomer mixture. This formulation was filtered through a 3 µm filter using a stainless-steel syringe and degassed by applying vacuum (about 40 mm Hg). In a glove box with a nitrogen gas atmosphere and less than about 0.2 percent oxygen gas, about 75 µL of the reactive mixture were dosed using an Eppendorf pipet at room temperature into the FC made of 90:10 (w/w) Zeonor/TT blend. The BC made of 90:10 (w/w) Z:PP blend was then placed onto the FC. The target spherical power of the mold designs was nominally minus one diopter. The molds were equilibrated for a minimum of twelve hours in the glove box prior to dosing. Pallets, each containing eight mold assemblies, were transferred into an adjacent glove box maintained at about 65° C., and the lenses were cured from the top and the bottom using 420 nm LED lights having an intensity of about 1.5 mW/cm$^2$ at the tray's location for 3 minutes and then about 5.0 mW/cm$^2$ at the tray's location for 5 minutes. The resulting lenses [Precursor 1 Lenses] were mechanically released from the base curve mold, leaving the Precursor 1 lenses adhered to the front curve molds. The Precursor 1 lenses adhered to the front curve molds were then placed back into the pallets which were subsequently selectively masked, by applying silicone cups to protect the central zone of each lens precursor, for the selective bleaching step.

Precursor 2 Lenses. A reactive monomer mixture was formed by mixing the reactive components listed in Table 1 with D3O such that the weight ratio of the reactive components to D3O was 62:38 (w/w). This formulation was filtered through a 3 µm filter using a stainless-steel syringe and degassed by applying vacuum (about 40 mm Hg). In a glove box with a nitrogen gas atmosphere and less than about 0.2 percent oxygen gas, about 75 µL of the reactive mixture were dosed using an Eppendorf pipet at room temperature into the FC made of 90:10 (w/w) Zeonor/TT blend. The BC made of 90:10 (w/w) Z:PP blend was then placed onto the FC. The target spherical power of the mold designs was nominally minus one diopter. The molds were equilibrated for a minimum of twelve hours in the glove box prior to dosing. Pallets, each containing eight mold assemblies, were transferred into an adjacent glove box maintained at about 65° C., and the lenses were cured from the top and the bottom using 405 nm LED lights having an intensity of about 2 mW/cm$^2$ for about 10 minutes. The resulting lenses [Precursor 2 Lenses] were mechanically released from the base curve mold, leaving the Precursor 2 lenses adhered to the front curve molds. The Precursor 2 lenses adhered to the front curve molds were then placed back into the pallets which were subsequently masked, by applying silicone cups to protect the central zone of each lens precursor, for the selective bleaching step. Two sets of Precursor 2 lenses were fabricated: one set having a minus one diopter nominal spherical power and the other set having a minus twelve diopter nominal spherical power.

Precursor 3 Lenses: A reactive monomer mixture was formed by mixing the reactive components listed in Table 1 with D3O such that the weight ratio of the reactive components to D3O was 77:23 (w/w). This formulation was filtered through a 3 µm filter using a stainless-steel syringe and degassed by applying vacuum (about 40 mm Hg). In a glove box with a nitrogen gas atmosphere and less than about 0.2 percent oxygen gas, about 75 µL of the reactive mixture were dosed using an Eppendorf pipet at room temperature into the FC made of 90:10 (w/w) Zeonor/TT blend. The BC made of 90:10 (w/w) Z:PP blend was then placed onto the FC. The target spherical power of the mold designs was nominally minus one diopter. The molds were equilibrated for a minimum of twelve hours in the glove box prior to dosing. Pallets, each containing eight mold assemblies, were transferred into an adjacent glove box maintained at about 65° C., and the lenses were cured from the top and the bottom for about 10 minutes using 405 nm LED lights having an intensity of about 2 mW/cm$^2$ at the tray's location. The resulting lenses [Precursor 3 Lenses] were mechanically released from the base curve mold, leaving the Precursor 3 lenses adhered to the front curve molds. The Precursor 3 lenses adhered to the front curve molds were then placed back into the pallets which were subsequently masked, by applying silicone cups to protect the central zone of each lens precursor for the selective bleaching step.

TABLE 1

Formulations

| Component | Precursor 1 Lenses Weight Percent | Precursor 2 Lenses Weight Percent | Precursor 3 Lenses Weight Percent |
|---|---|---|---|
| OH-mPDMS (n = 4) | 25 | 0 | 0 |
| OH-mPDMS (n = 15) | 28 | 0 | 0 |
| mPDMS | 0 | 31 | 30.9 |
| SIMAA | 0 | 28 | 27.9 |
| DMA | 21 | 24 | 23.92 |
| HEMA | 11.38 | 5.98 | 5.94 |
| PVP K90 | 9 | 7 | 7 |
| EGDMA | 0.25 | 0 | 0 |
| TEGDMA | 0 | 1.5 | 1.5 |
| Tegomer MA | 4 | 0 | 0 |
| Norbloc | 1 | 2 | 2 |
| RB247 | 0.02 | 0.08 | 0 |
| Dye1 | 0.1 | 0.1 | 0 |
| Dye2 | 0 | 0 | 0.5 |
| Omnirad 1870 | 0.25 | 0.34 | 0.34 |
| Σ Components | 100 | 100 | 100 |

Example 1

A pallet containing Precursor 1 lenses adhered to their front curve molds was setup in which the central zone of each lens precursor was masked from the oxidant solution using soft silicone cups. The soft silicone cups had diameters of ten millimeters. The lenses adhered to the front curve molds had diameters greater than ten millimeters. The array of soft silicone cups was lowered onto the lenses such that there was just enough compression between the cups and the lenses to prevent oxidant solution from reaching the central portion of the lenses, thereby allowing only the periphery of the lenses to be exposed to the oxidant solution.

About one milliliter of a 0.5 weight percent aqueous sodium hypochlorite neutralized to pH 7.2 was added to each front curve mold. The oxidizing solution was prepared by diluting a five weight percent aqueous sodium hypochlorite by nine parts of deionized water followed by pH adjustment to 7.2 using 3N aqueous HCl. The center dyed only lenses were removed after five (Example 1A lenses), thirty (Example 1B lenses), and sixty (Example 1C lenses) seconds of exposure to the 0.5 weight percent aqueous sodium hypochlorite solution and immediately rinsed with DIW. The oxidized lenses were then released by soaking in 70% (v/v) aqueous IPA (about one hour), extracted two times with 70% (v/v) aqueous IPA for thirty minutes, hydrated with deionized water for thirty minutes, and then equilibrated with packing solution. Resulting lenses were stored in vials in packing solution. Significant bleaching of the periphery was observed after five seconds. As shown in FIG. 1, the UV-VIS spectra of these Example 1A-C lenses measured in the central unbleached zones were identical to the original fully dyed Precursor 1 lenses. Moreover, the spherical power and lens diameters of Example 1A-C lenses were virtually unaffected by the peripherical oxidation as listed in Table 2.

TABLE 2

Lens Parameters

| | Precursor 1 Lenses (0 seconds) | Ex. 1A Lenses (5 seconds) | Ex. 1B Lenses (30 seconds) | Ex. 1C Lenses (60 seconds) |
|---|---|---|---|---|
| Spherical Power (Diopters) | 0.83 | 0.85 | 0.85 | 0.84 |
| Lens Diameter (millimeters) | 14.33 | 14.40 | 14.41 | 14.39 |
| RMS 65 (micrometers) | 0.028 | 0.022 | 0.024 | 0.024 |

Example 2

Example 1 was essentially repeated using 7-millimeter diameter soft silicone cups instead of 10-millimeter diameter cups, thereby bleaching a wider periphery, and using only one exposure time to the 0.5 weight percent aqueous sodium hypochlorite solution. The exposure time was 60 seconds.

A pallet containing Precursor 2 lenses adhered to their front curve molds was setup in which the central zone of each lens precursor was masked from the oxidant solution using soft silicone cups. The soft silicone cups had diameters of seven millimeters. The lenses adhered to the front curve molds had diameters greater than ten millimeters. The array of soft silicone cups was lowered onto the lenses such that there was just enough compression between the cups and the lenses to prevent oxidant solution from reaching the central portion of the lenses, thereby allowing only the periphery of the lenses to be exposed to the oxidant solution.

About one milliliter of a 0.5 weight percent aqueous sodium hypochlorite neutralized to pH 7.2 was added to each front curve mold. The center dyed only lenses were removed after sixty seconds of exposure to the 0.5 weight percent aqueous sodium hypochlorite solution and immediately rinsed with DIW. The oxidized lenses were then released by soaking in 70% (v/v) aqueous IPA (about one hour), extracted two times with 70% (v/v) aqueous IPA for thirty minutes, hydrated with deionized water for thirty minutes, and then equilibrated with packing solution. Lenses were stored in vials in packing solution.

Various physical properties, mechanical properties, and lens parameters of these lenses were measured before and after the bleaching step and are listed in Table 3. Example 2A lenses were made by bleaching the periphery of Precursor 2 lenses having a minus one diopter spherical power. Example 2B lenses were made by bleaching the periphery of Precursor 2 lenses having a minus twelve diopter spherical power. None of the observed changes in properties and parameters after peripheral bleaching was statistically significant. The data on the minus twelve diopter lenses before and after bleaching were more variable than the data on the minus one diopter lenses. The periphery of Example 2A and 2B lenses was clear, that is, appeared undyed in comparison to the dyed region. The UV-VIS transmission spectra of the Precursor 2 lenses (unbleached) and of Example 2A and 2B lenses (dyed center zone after bleaching the periphery) are shown in FIG. 2 for the minus one diopter lenses and in FIG. 3 for the minus twelve diopter lenses. The UV-VIS spectra showed that the peripheral bleaching process had a small but acceptable impact on the visible light transmission profiles of the lenses.

TABLE 3

Various Properties and Parameters

|  | Precursor 2 Lens (minus 1 D) | Example 2A | Precursor 2 Lens (minus 12 D) | Example 2B |
|---|---|---|---|---|
| Modulus (psi) | 64.2 | 68.1 | Not measured | Not measured |
| Tensile Strength (psi) | 96.5 | 93.9 | Not measured | Not measured |
| Elongation to Break( %) | 293 | 290 | Not measured | Not measured |
| Toughness (in-lbs/in$^3$) | 137 | 133 | Not measured | Not measured |
| Sessile Drop FC Contact Angle (degrees) | 78.6 | 88.1 | Not measured | Not measured |
| Sessile Drop BC Contact Angle (degrees) | 79.9 | 93.9 | Not measured | Not measured |
| Water Content (wt. %) | 41.3 | 42.2 | 40.7 | 41.4 |
| Center Thickness (μm) | 81.5 | 83.0 | 79.1 | 78.4 |
| Diameter (mm) | 13.2 | 13.3 | 13.3 | 13.3 |
| RMS_65 (μm) | 0.0342 | 0.0367 | 0.377 | 0.159 |

Example 3

A pallet containing Precursor 3 lenses adhered to their front curve molds was treated with a 0.5 weight percent aqueous sodium hypochlorite neutralized to pH 7.2 at ambient temperature for 3 minutes. The lenses were completely decolorized edge to edge. These oxidized lenses were immediately rinsed with DIW. The oxidized lenses were then released by soaking in 70% (v/v) aqueous IPA (about one hour), extracted two times with 70% (v/v) aqueous IPA for thirty minutes, hydrated with deionized water for thirty minutes, and then equilibrated with packing solution. The oxidized lenses [Example 3 lenses] were stored in vials in packing solution. Some Precursor 3 lenses and some Example 3 lenses were sterilized by autoclaving at 121° C. for 30 minutes. As shown in FIG. 4, the UV-VIS spectra of both Precursor 3 lenses and Example 3 lenses were essentially unchanged by sterilization. Moreover, the average percent transmission between 400 nm and 600 nm increased when Precursor 3 lenses were oxidized into Example 3 lenses both before and after sterilization; the data is listed in Table 4. If Example 3 was conducted using the soft silicone cups to isolate the central zone of the Precursor 3 lenses from the oxidant solution, allowing only the periphery to be oxidized, then a similar difference in percent transmission between the center zone and periphery would be expected. Any differences are likely caused by differences in the thickness profiles of the locations being measured.

TABLE 4

Average Percent Transmission

|  | Sterilized (Yes/No) | Average Percent Transmission across 400-600 nm |
|---|---|---|
| Precursor 3 Lenses | No | 58.52 |
| Example 3 Lenses | No | 88.10 |
| Precursor 3 Lenses | Yes | 56.24 |
| Example 3 Lenses | Yes | 89.47 |

Precursor 4 Lens

A reactive monomer mixture was formed by mixing the reactive components listed in Table 5 with 3M3P such that the weight ratio of the reactive components to 3M3P was 77:23 (w/w). This formulation was filtered through a 3 μm filter using a stainless-steel syringe and degassed by applying vacuum (about 40 mm Hg) prior to use. Using this reactive monomer mixture, precursor 4 lenses were prepared on a pilot line consisting of a two-zone cure tunnel in which irradiation occurred from the top and from the bottom of the tunnel under a nitrogen gas atmosphere (less than 3.0±0.5% oxygen gas). Pallets containing eight mold assemblies each traveled down the tunnel. The mold assemblies were created by dosing the reactive monomer mixture into front curve molds made of 90:10 (w/w) Zeonor/TT blend, followed by placing base curve molds made of the same polymeric blend on top of the dosed front curves, thereby forming a lens shaped cavity in-between. The first zone in the cure tunnel used 435 nm LED lamps having an intensity of about 5 mW/cm$^2$ as measured on the pallet supporting the mold assemblies. The second zone used the same lamps but having an intensity of about 12 mW/cm$^2$ again as measured on the pallet supporting the mold assemblies. The temperature was held constant in both zones at 65° C. The pallets were irradiated for 6 minutes in the first zone and for 3 minutes in the second zone of the cure tunnel for a total cure time of 9 minutes.

The resulting precursor 4 lenses were mechanically released from the base curve mold, leaving the lenses adhered to the front curve molds. The precursor 4 lenses adhering to the front curve molds were then placed back into the pallets which were subsequently masked, by applying silicone cups to protect the central zone of each precursor 4 lens for the selective bleaching step.

TABLE 5

Reactive Monomer Mixture

| Component | Precursor 4 Lens Weight Percent |
|---|---|
| OH-mPDMS (n = 4) | 25.8 |
| OH-mPDMS (n = 15) | 30.04 |
| DMA | 22 |
| HEMA | 8.6 |
| PVP K90 | 9 |
| EGDMA | 0.75 |
| Norbloc | 1 |
| RB247 | 0.06 |
| Dye 2 | 0.09 |
| Dye 3 | 2.41 |
| Omnicure 819 | 0.25 |
| Σ Component Mixture | 100 |
| Diluent | 3M3P |

Examples 4

A pallet containing lenses adhered to their front curve molds was setup in which the central zone of each lens precursor was masked from the oxidant solution using soft silicone cups. The soft silicone cups had diameters of ten millimeters. The lenses adhered to the front curve molds had diameters greater than ten millimeters. The array of soft silicone cups was lowered onto the lenses using a mechanical fixture, such that there was just enough compression between the cups and the lenses to prevent oxidant solution from reaching the central portion of the lenses, thereby allowing only the periphery of the lenses to be exposed to the oxidant solution.

A secondary container was filled with a 0.5 weight percent aqueous sodium hypochlorite solution, neutralized to pH 7.2. The oxidizing solution was prepared by diluting a five-weight percent aqueous sodium hypochlorite solution by nine parts of deionized water followed by pH adjustment to 7.2 using 3N aqueous HCl. The mechanical fixture containing the contact lenses protected by silicone cups was submerged in the oxidizing solution. The center dyed only lenses (Example 4 Lenses) were removed after 180 seconds of exposure to the 0.5 weight percent aqueous sodium hypochlorite solution and immediately rinsed with DIW. The example 4 lenses were then released by soaking in 70% (v/v) aqueous IPA (about one hour), extracted two times with 70% (v/v) aqueous IPA for thirty minutes, hydrated with deionized water for thirty minutes, and then equilibrated with packing solution. Resulting lenses were stored in vials in packing solution.

Various physical properties, mechanical properties, and lens parameters of these lenses were measured before and after the bleaching step and are listed in Table 6. Example 4 lenses were made by bleaching the periphery of Precursor 4 lenses having a minus one diopter spherical power. There were small changes in the properties and parameters after peripheral bleaching. As shown in FIG. 5, the UV-VIS spectrum of the example 4 lens (average of five lenses) measured in the central unbleached zone was only slightly different than that of the original fully dyed precursor 4 lenses (average of three lenses).

TABLE 6

Various Properties and Parameters

|  | Precursor 4 Lens (minus 1 D) | Example 4 |
|---|---|---|
| Modulus (psi) | 93.5 | 137.6 |
| Tensile Strength (psi) | 114.9 | 140.2 |
| Elongation to Break (%) | 245.7 | 218.4 |
| Toughness (in-lbs/in$^3$) | 146.5 | 167.9 |
| Sessile Drop FC Contact Angle (degrees) | 50.1 | 39.9 |
| Sessile Drop BC Contact Angle (degrees) | 47.9 | 35.7 |
| Center Thickness (μm) | 75.0 | 78.0 |
| Diameter (mm) | 14.8 | 14.8 |
| RMS_65 (μm) | 0.0246 | 0.0274 |

We claim:

1. A contact lens comprising:
   a first region;
   a second region;
   a visible light absorbing chromophore; and
   a derivative of the visible light absorbing chromophore,
   wherein the first region contains the visible light absorbing chromophore and the second region contains the derivative of the visible light absorbing chromophore, and wherein the second region has a greater average percent transmission than the first region across a wavelength range of 400 nm to 600 nm.

2. The contact lens of claim 1 wherein the average percent transmission of the second region is at least 5 percent greater than the average percent transmission of the first region.

3. The contact lens of claim 1 wherein the average percent transmission of the visible light absorbing chromophore across the wavelength range of 400 to 600 nm is 95 percent or less.

4. The contact lens of claim 1 wherein the visible light absorbing chromophore contains an oxidizable functional group.

5. The contact lens of claim 1 wherein the derivative is an oxidized derivative of the visible light absorbing chromophore.

6. The contact lens of claim 1 wherein the visible light absorbing chromophore is a static chromophore or is a photochromic chromophore.

7. The contact lens of claim 1 wherein the first region comprises a central zone of the contact lens and the second region comprises a peripheral zone of the contact lens.

8. The contact lens of claim 1 wherein the visible light absorbing chromophore comprises one or more light-absorbing functionalities selected from: a benzotriazole, an acetophenone, a benzophenone, an azo, a diphenyldiazine, an alkoxy aniline, a tetrahydro-napthalene, an anthraquinone, an anthracene, a dihydroanthracene, a selenoxanthene, a thioxanthene, and an acridine.

9. The contact lens of claim 1 wherein the visible light absorbing chromophore comprises one or more light-absorbing functionalities selected from: a chromene, a spiro-pyran, an oxazine, a mercury dithizonate, a fulgide, a fulgimide, an organo-metal dithiozonate, and a naph-thacenedione.

10. The contact lens of claim 1 wherein the visible light absorbing chromophore has a substructure of formula I:

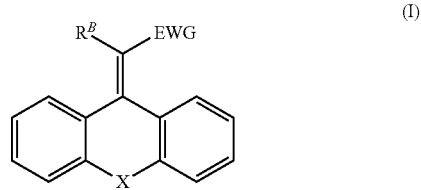

wherein: $R^B$ is —C(=O)H or EWG; X is NR, S or Se; R is H, $C_1$-$C_6$ alkyl, cycloalkyl, heterocycloalkyl, aryl, or heteroaryl; and EWG at each occurrence is independently an electron withdrawing group.

11. The contact lens of claim 1 wherein the derivative of the visible light absorbing chromophore has a substructure of formula II:

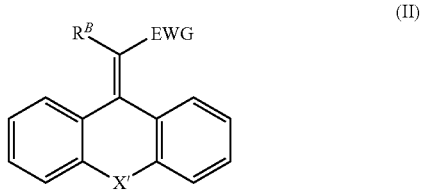

wherein: X' is $N^+RO^-$, SO, $SO_2$, SeO or $SeO_2$.

12. A method for making the contact lens of claim 1, the method comprising:
providing a lens precursor having a first region and a second region and containing a visible light absorbing chromophore in the first region and the second region; and
selectively derivatizing the visible light absorbing chromophore within the second region to form a derivative of the visible light absorbing chromophore, the derivative having a greater average percent transmission than the visible light absorbing chromophore across a wavelength range of 400 nm to 600 nm.

13. The method of claim 12 wherein the lens precursor is a polymerization reaction product of a reactive mixture comprising: (a) a chromophore-containing monomer; and (b) a monomer suitable for making the contact lens precursor.

14. The method of claim 13 wherein the chromophore-containing monomer is a compound of formula IV:

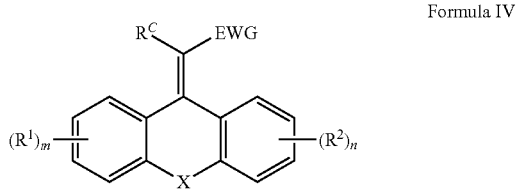

Formula IV wherein:
m and n are independently 0, 1, 2, 3, or 4;
$R^C$ is EWC or a group of formula -T-Y—$P_g$, wherein T is a bond, O, or NR, Y is a linking group, and $P_g$ is a polymerizable group;
X is NR, S or Se;
R at each occurrence is independently H, $C_1$-$C_6$ alkyl, cycloalkyl, heterocycloalkyl, aryl, heteroaryl, or Y—$P_g$;
$R^1$ and $R^2$, when present, are independently at each occurrence $C_1$-$C_6$ alkyl, $C_1$-$C_6$ alkoxy, $C_1$-$C_6$ thioalkyl, $C_1$-$C_6$ selenoalkyl, $C_3$-$C_7$ cycloalkyl, aryl, halo, hydroxy, amino, $NR^3R^4$, benzyl, or —Y—$P_g$, wherein $R^3$ and $R^4$ are independently H or $C_1$-$C_6$ alkyl, or two adjacent $R^1$ or $R_2$ groups, together with the carbon atoms to which they are attached, combine to form a cycloalkyl or aryl ring; and
EWG at each occurrence is independently an electron withdrawing group,
wherein the compound of formula I contains at least one $P_g$ group.

15. The method of claim 14 wherein m and n are each independently 0 or 1.

16. The method of claim 14 wherein Y at each occurrence is independently alkylene, cycloalkylene, heterocycloalkylene, arylene, heteroarylene, oxaalkylene, alkylene-amide-alkylene, alkylene-amine-alkylene, or combinations thereof.

17. The method of claim 14 wherein $P_g$ at each occurrence independently comprises styryl, vinyl carbonate, vinyl ether, vinyl carbamate, N-vinyl lactam, N-vinylamide, (meth)acrylate, or (meth)acrylamide.

18. The method of claim 14 wherein X is S or NR.

19. The method of claim 14 wherein EWG at each occurrence is cyano.

20. The method of claim 13 wherein the chromophore-containing monomer is a compound of formula III:

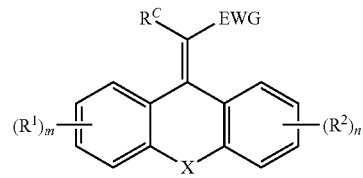

Formula III wherein:
m and n are independently 0, 1, 2, 3, or 4;
$R^C$ is EWC or a group of formula -T-Y—$P_g$, wherein T is a bond, O, or NR, Y is a linking group, and $P_g$ is a polymerizable group;
X is O, NR, S or Se;
R at each occurrence is independently H, $C_1$-$C_6$ alkyl, cycloalkyl, heterocycloalkyl, aryl, heteroaryl, or Y—$P_g$;
$R^1$ and $R^2$, when present, are independently at each occurrence $C_1$-$C_6$ alkyl, $C_1$-$C_6$ alkoxy, $C_1$-$C_6$ thioalkyl, $C_1$-$C_6$ selenoalkyl, $C_3$-$C_7$ cycloalkyl, aryl, halo, hydroxy, amino, $NR^3R^4$, benzyl, or —Y—$P_g$, wherein $R^3$ and $R^4$ are independently H or $C_1$-$C_6$ alkyl, or two adjacent $R^1$ or $R_2$ groups, together with the carbon atoms to which they are attached, combine to form a cycloalkyl or aryl ring; and
EWG at each occurrence is independently an electron withdrawing group, wherein the compound of formula III contains at least one $P_g$ group and at least one oxidizable functional group.

21. The method of 13 wherein the chromophore-containing monomer comprises:
2-(2-cyano-2-(9H-thioxanthen-9-ylidene)acetamido)ethyl methacrylate;
2-(2-cyano-2-(9H-thioxanthen-9-ylidene)acetamido)ethyl acrylate;
N-(2-(2-cyano-2-(9H-thioxanthen-9-ylidene)acetamido)ethyl)methacrylamide;
N-(2-(2-cyano-2-(9H-thioxanthen-9-ylidene)acetamido)ethyl)acrylamide;
2-(2-cyano-N-methyl-2-(9H-thioxanthen-9-ylidene)acetamido)ethyl methacrylate;
2-cyano-2-(9H-thioxanthen-9-ylidene)-N-(2-(N-vinylacetamido)ethyl)acetamide;
2-(2-(acridin-9(1OH)-ylidene)-2-cyanoacetamido)ethyl acrylate;
N-(2-(2-(acridin-9(1OH)-ylidene)-2-cyanoacetamido)ethyl)methacrylamide;
N-(2-(2-(acridin-9(1OH)-ylidene)-2-cyanoacetamido)ethyl)acrylamide;
2-(2-(acridin-9(1OH)-ylidene)-2-cyano-N-methylacetamido)ethyl methacrylate;
2-(acridin-9(1OH)-ylidene)-2-cyano-N-(2-(N-vinylacetamido)ethyl)acetamide;
2-(2-cyano-2-(9H-thioxanthen-9-ylidene)acetamido)-2-methylpropyl methacrylate;
(Z)-2-(2-cyano-2-(3-hydroxyacridin-9(1OH)-ylidene)acetamido)ethyl methacrylate;
2-(2-cyano-2-(10-methylacridin-9(1OH)-ylidene)acetamido)ethyl methacrylate;
2-(2-cyano-2-(3,6-dihydroxyacridin-9(1OH)-ylidene)acetamido)ethyl methacrylate;
(E)-2-(2-cyano-2-(2,4-dichloro-9H-thioxanthen-9-ylidene)acetamido)ethyl methacrylate;
(E)-2-(2-(2-chloro-9H-thioxanthen-9-ylidene)-2-cyanoacetamido)ethyl methacrylate;

(E)-2-(2-cyano-2-(2-isopropyl-9H-thioxanthen-9-ylidene)acetamido)ethyl methacrylate;
(E)-2-(2-cyano-2-(4-isopropyl-9H-thioxanthen-9-ylidene)acetamido)ethyl methacrylate;
2-(3-oxo-2-(9H-thioxanthen-9-ylidene)propanamido) ethyl methacrylate;
2-(3-oxo-2-(9H-thioxanthen-9-ylidene)butanamido)ethyl methacrylate;
2-(3-methoxy-3-oxo-2-(9H-thioxanthen-9-ylidene)propanamido)ethyl methacrylate;
2-(3-amino-3-oxo-2-(9H-thioxanthen-9-ylidene)propanamido)ethyl methacrylate;
2-(2-cyano-2-(10,10-dioxido-9H-thioxanthen-9-ylidene)acetamido)ethyl methacrylate;
N-(2-(2-cyano-2-(10-methylacridin-9(1OH)ylidene)acetamido)ethyl) methacrylamide;
2-(2-cyano-2-(9H-thioxanthen-9-ylidene)acetoxy)ethyl methacrylate;
2-(2-cyano-2-(2-methoxy-10-propylacridin-9(1OH)-ylidene)acetamido)ethyl methacrylate;
N-(2-(2-cyano-2-(10-methylacridin-9(1OH)-ylidene)acetamido)ethyl)methacrylamide;
2-(2-(10-butyl-2-methoxyacridin-9(1OH)-ylidene)-2-cyanoacetamido)ethyl methacrylate;
2-((9-(dicyanomethylene)-9H-thioxanthen-2-yl)oxy) ethyl methacrylate;
2-(2-cyano-2-(3-(propylthio)-9H-thioxanthen-9-ylidene)acetamido)ethyl methacrylate;
2-(2-cyano-2-(3-(propylthio)-9H-xanthen-9-ylidene)acetamido)ethyl methacrylate;
3-((9-(1-cyano-2-((2-(methacryloyloxy)ethyl)amino)-2-oxoethylidene)-9H-thioxanthen-3-yl)thio)propyl methacrylate;
3-((9-(1-cyano-2-((2-(methacryloyloxy)ethyl)amino)-2-oxoethylidene)-9H-xanthen-3-yl)thio)propyl methacrylate;
3-((9-(dicyanomethylene)-9H-thioxanthen-3-yl)thio)propyl methacrylate;
3-((9-(dicyanomethylene)-9H-xanthen-3-yl)thio)propyl methacrylate; or
a mixture of two or more thereof.

22. The method of claim 13 wherein the monomer suitable for making the contact lens precursor comprises a hydrophilic component, a silicone-containing component, or mixtures thereof.

* * * * *